(12) United States Patent
Yamane et al.

(10) Patent No.: US 8,296,062 B2
(45) Date of Patent: Oct. 23, 2012

(54) METHOD FOR DISPLAYING TRAFFIC INFORMATION AND NAVIGATION SYSTEM

(75) Inventors: Kenichiro Yamane, Ibaraki (JP); Mariko Okude, Ibaraki (JP)

(73) Assignee: Hitachi, Ltd., Tokyo (JP)

( * ) Notice: Subject to any disclaimer, the term of this patent is extended or adjusted under 35 U.S.C. 154(b) by 408 days.

(21) Appl. No.: 11/648,533

(22) Filed: Jan. 3, 2007

(65) Prior Publication Data
US 2007/0155404 A1 Jul. 5, 2007

(30) Foreign Application Priority Data

Jan. 4, 2006 (JP) ................................. 2006-000160

(51) Int. Cl.
G01C 21/00 (2006.01)
G01C 21/34 (2006.01)
G01C 1/123 (2006.01)
(52) U.S. Cl. ......... 701/432; 701/423; 701/428; 701/431
(58) Field of Classification Search ............. 340/995.13, 340/988–994, 995.1–995.19, 995.2, 995.21–995.28, 340/996, 6–908; 701/200–225, 400–541, 701/226; 455/456.1, 441, 3.06, 456.3, 457, 455/414.1, 575.9, 556.2, 566; 370/328, 310.2, 370/338; 342/113, 114, 118, 147, 109, 104, 342/357.1–357.17
See application file for complete search history.

(56) References Cited

U.S. PATENT DOCUMENTS

| | | | |
|---|---|---|---|
| 6,351,707 B1 * | 2/2002 | Ichikawa | 710/209 |
| 6,356,839 B1 * | 3/2002 | Monde et al. | 701/210 |
| 6,363,240 B2 * | 3/2002 | Ito | 455/3.06 |
| 6,865,480 B2 * | 3/2005 | Worng | 710/210 |
| 7,463,973 B2 * | 12/2008 | Okude et al. | 701/423 |
| 2004/0150534 A1 * | 8/2004 | Linn | 340/995.13 |
| 2004/0203918 A1 * | 10/2004 | Moriguchi et al. | 455/456.1 |
| 2004/0204845 A1 * | 10/2004 | Wong | 701/210 |
| 2004/0249568 A1 * | 12/2004 | Endo et al. | 701/209 |
| 2005/0096842 A1 * | 5/2005 | Tashiro | 701/210 |
| 2006/0055565 A1 * | 3/2006 | Kawamata et al. | 340/995.13 |
| 2006/0058950 A1 * | 3/2006 | Kato et al. | 701/208 |

FOREIGN PATENT DOCUMENTS

| | | |
|---|---|---|
| JP | 2002-319090 A | 10/2002 |
| JP | 2004-108849 A | 4/2004 |

OTHER PUBLICATIONS

Japanese Office Action mailed Mar. 22, 2011.
English language machine translation of paragraphs 0056-0063 of previously submitted Japanese publication JP 2002-319090.

* cited by examiner

*Primary Examiner* — Jinsong Hu
*Assistant Examiner* — San Htun
(74) *Attorney, Agent, or Firm* — Crowell & Moring LLP

(57) ABSTRACT

There is provided a method for displaying traffic information, a navigation system, and a program for displaying the traffic information. A data processing unit receives a specified time 1203, which is a future or current time, through an operation input unit, specifies an area of a map to be displayed, and then obtains map data of the specified area from a map data storage unit. The data processing unit obtains traffic information 1201 of the specified time from a traffic information storage unit, and then makes the display unit show links in association with the traffic information 1201. It is, therefore, possible to display the traffic information of an arrival time at each point on a route in a user-friendly manner.

4 Claims, 20 Drawing Sheets

FIG.2

PREDICTED TRAFFIC INFORMATION

| (1) INFORMATION CREATION TIME | | | |
|---|---|---|---|
| (2) PREDICTED TIME NUMBER | | | |
| (3) PREDICTED TIME DATA | (4) PREDICTED TIME | | |
| | (5) MESH DATA NUMBER | | |
| | (6) MESH DATA | (7) MESH CODE | |
| | | (8) LINK DATA NUMBER | |
| | | (9) LINK DATA | (10) LINK CLASSIFICATION |
| | | | (11) LINK NUMBER |
| | | | (12) TRAFFIC CONGESTION DEGREE |
| | | | (13) TRAFFIC CONGESTION LENGTH |
| | | | (14) TRAVEL TIME |

FIG.3

PREDICTED WEATHER INFORMATION

| (1) PREDICTED INFORMATION (TIME) NUMBER | | |
|---|---|---|
| (2) PREDICTED TIME DATA | (3) PREDICTED TIME | |
| | (4) MESH DATA NUMBER | |
| | (5) MESH DATA | (6) MESH CODE |
| | | (7) WEATHER FORECAST |
| | | (8) RAINFALL PROBABILITY |
| | | (9) TEMPERATURE |
| | | (10) HUMIDITY |
| | | (12) WIND VELOCITY |

TRAFFIC INFORMATION SETTING SCREEN

○ STATISTICAL TRAFFIC INFORMATION (NO DOWNLOADING)
○ CURRENT TRAFFIC INFORMATION (DOWNLOADING INCLUDED)
⊙ PREDICTED TRAFFIC INFORMATION (DOWNLOADING INCLUDED)

FIG.10

| CANDIDATE LINK NUMBER | COST | CONNECTION SOURCE LINK NUMBER | TOTAL COST | DECISION FLAG |
|---|---|---|---|---|
| ***** | 5 | ***** | 30 | UNDECIDED |
| ***** | 5 | ***** | 25 | UNDECIDED |
| ***** | 10 | ***** | 35 | UNDECIDED |
| ⋮ | ⋮ | ⋮ | ⋮ | ⋮ |
| ***** | 10 | ***** | 7 | DECIDED |

…

METHOD FOR DISPLAYING TRAFFIC INFORMATION AND NAVIGATION SYSTEM

CROSS-REFERENCE TO RELATED APPLICATION(S)

This application claims the foreign priority benefit under Title 35, United States Code, §119 (a)-(d), of Japanese Patent Application No. 2006-160, filed on Jan. 4, 2006 in the Japan Patent Office, the disclosure of which is herein incorporated by reference in its entirety.

BACKGROUND OF THE INVENTION

1. Field of the Invention

The present invention relates to a navigation device, and more particularly to a system for displaying traffic information in a car-mounted navigation device.

2. Description of the Related Art

Traffic information has been recently more and more utilized in a car-mounted navigation device along with the spread of the vehicle information and communication system (VICS). For example, Japanese Laid-open Patent Application No. 2004-108849 discloses a system for displaying traffic congestion information on a plurality of locations on a map screen. In this system, the traffic congestion information of the same time period, for example a current time, is displayed with regard to a plurality of locations.

What users want to know, however, is the traffic congestion information of a future time, at which the users will arrive at a location (hereinafter referred to as a predicted arrival time). In the above-mentioned system, the traffic congestion information of the same time period, for example a current time, is shown on any locations on a display map, and therefore it is impossible for the users to accurately know the traffic congestion information of the predicted arrival time at each location on a route.

SUMMARY OF THE INVENTION

The present invention is accomplished to solve the above-mentioned problem, and the object of the present invention is to display the traffic information of a specified time at each location on a route in a user-friendly manner.

According to one aspect of the present invention, there is provided a method for displaying the traffic information and a navigation system. In the invention, a data processing unit receives a specified time, which is a future or current time, through an operation input unit, specifies an area of a map to be displayed, and then obtains map data of the specified area from a map data storage unit. The data processing unit obtains traffic information of the specified time from a traffic information storage unit, and then makes the display unit show links in association with the traffic information.

According to another aspect of the present invention, there is provided a method for displaying traffic information and a navigation system. In the invention, the data processing unit calculates a recommended route to be traveled by the vehicle. When receiving a departure time, at which the vehicle departs from a predetermined point, through the operation input unit, the processing unit calculates a predicted arrival time, at which the vehicle arrives at a predetermined point on the recommended route, based on the departure time and the total travel time. The data processing unit obtains the traffic information of the specified time from the traffic information storage unit, and makes the display unit show the predetermined point on the recommended route in association with the predicted arrival time.

According to the present invention, it is possible to display the traffic information of a specified time at each location on a route in a user-friendly manner.

BRIEF DESCRIPTION OF THE DRAWINGS

The object and features of the present invention will become more readily apparent from the following detailed description taken in conjunction with the accompanying drawings in which:

FIG. 2 shows an example of a distribution format of predicted traffic information;

FIG. 3 shows an example of a distribution format of predicted weather information;

FIG. 10 is a chart illustrating an example of the heap table;

DETAILED DESCRIPTION OF THE INVENTION

[Navigation System]

Hereinafter, an embodiment of the present invention will be described with reference to the attached drawings.

Figure 1:
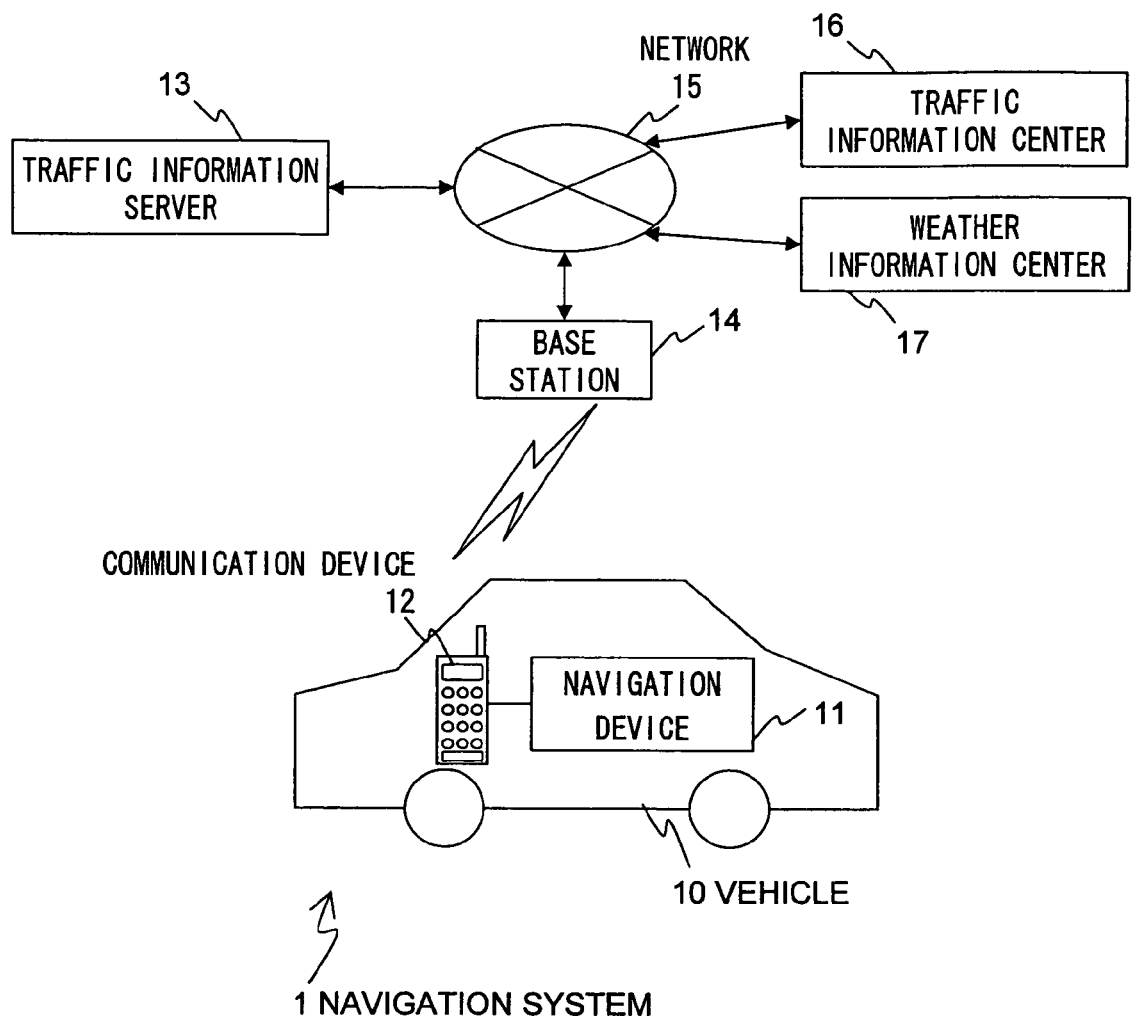
FIG. 1 schematically illustrates a configuration of a navigation system according to an embodiment of the present invention.

FIG. 1 schematically illustrates a configuration of a navigation system according to an embodiment of the present invention.

As shown in FIG. 1, a navigation system 1 of the present embodiment mainly includes a navigation device 11 mounted on a vehicle 10 and a traffic information server (traffic information storage unit) 13 located outside the vehicle 10. The navigation device 11 and the traffic information server 13 are coupled to each other via a communication device 12, a base station 14, and a network 15. The traffic information server 13 and the base station 14 are connected to a traffic information center 16 and a weather information center 17 via the network 15. The traffic information center 16 provides services of collecting data on current and past traffic information, and of distributing the collected traffic information to the traffic information server 13 through the network 15. In this example, the traffic information basically shows traffic situations at a current time. That is, the traffic information is not the future traffic information but the current traffic information.

Table 1 shows an example of a distribution format of the traffic information.

TABLE 1

MESH CODE
LINK NUMBER
LINK CLASSIFICATION
INFORMATION CREATION TIME
TRAFFIC CONGESTION INFORMATION
TRAVEL TIME DATA
INCIDENT AND REGULATION INFORMATION
DISTURBANCE INFORMATION
PARKING INFORMATION
SA/PA INFORMATION
CHARACTER MESSAGE INFORMATION
.
.
.

The traffic information is basically distributed in each link, specifically along with a mesh code, a link number, a link classification, and an information creation time. The mesh code is an identification code of a mesh area, which is defined by dividing areas on the map. The link number is a number uniquely assigned to a link in a mesh code. The link classification is an identification code of a link type. The information creation time is a time at which the traffic information is created for each identification code of a link (link number). The traffic information further includes traffic congestion information, travel time data, incident and regulation information, disturbance information, parking information, service area (SA)/parking area (PA) information, character message information, or the like.

In the embodiment, the link is defined by dividing a road by nodes, for example, an intersection or the like. The link is the minimum unit in the map creation in the navigation system 1. The travel time is a time required for a vehicle to pass through a link. The mesh is defined by dividing areas on the earth into a certain rectangle.

The weather information center 17 provides services of collecting weather information and of distributing the collected weather information to the traffic information server 13 via the network 15.

The traffic information server 13 receives current and past traffic information from the traffic information center 16, based on which the traffic information server 13 creates and restores predicted traffic information (traffic information in the claims) that is future traffic information. The traffic information server 13 has functions to search and distribute the predicted traffic information stored therein to the navigation device 11 in response to requests from the navigation device 11. The requests include, for example, a request for the download of the traffic information of a predicted time with regard to a prescribed link. The predicted traffic information is distributed in each link in the same manner as the traffic information distributed by the traffic information center 16. The traffic information server 13 has functions to receive the weather information from the weather information center 17 and distribute the received weather information to the navigation device 11.

The navigation device 11 requests the download for the predicted traffic information of a specified time with regard to a specified link or mesh to the traffic information server 13, and receives the predicted traffic information transmitted from the traffic information server 13. In the case that a data storage device 502 (see FIG. 5) of the navigation device 11 includes statistical traffic information, the navigation device 11 can calculates the predicted traffic information by using the statistical traffic information. In this case, the navigation device 11 need not download the predicted traffic information. The navigation device 11 has functions to display the link and the predicted traffic information or the traffic information such as the statistical traffic information all together and to search a route based on the predicted traffic information. The navigation device 11 will be described in detail later with reference to FIG. 5.

The communication device 12 includes a broadband communication device, such as a cellular phone, a personal handy phone system (PHS), or a wireless local area network (LAN). The navigation system 11 accesses the traffic information server 13 to receive the predicted traffic information or the like through the communication device 12 on a regular basis, or in response to requests from users.

FIG. 2 illustrates an example of a distribution format of the predicted traffic information.

Hereinafter, a description will be given on contents of the distribution format shown in FIG. 2.

An information creation time indicated by (1) is a time at which the predicted traffic information is created. A predicted time number (2) is the number of the predicted times included in the predicted traffic information. Predicted time data (3) is data on the corresponding predicted time, and includes the following data. A predicted time (4) includes either a current or future time. A mesh data number (5) is the number of mesh data stored in the predicted traffic information to be distributed. The mesh data (6) is data on the individual mesh, and includes the following data. The mesh code (7) is a number assigned to each mesh. A link data number (8) is the number of link data stored in the mesh of the predicted traffic information to be distributed. The link data (9) is data on the individual link, and includes the following data. In the link classification (10) is stored the identification code of the link type, such as an urban highway, an urban express way, or a public road. In the link number (11) is stored a number assigned to the individual link. In traffic congestion degree (12) is stored, for example, the degree of the traffic congestion, which is calculated based on an average speed of a vehicle in a link. A traffic congestion length (13) is defined by a queue length of vehicles running at a speed less than or equal to a certain speed. The travel time (14) is a time required for a vehicle to pass through a link. In order to distribute the current traffic information, the data showing the current time in a field of the predicted time is distributed.

In the predicted traffic information, one mesh code includes a plurality of link data, one predicted time includes a plurality of mesh codes, and one information creation time includes a plurality of predicted times.

FIG. 3 illustrates an example of a distribution format of the predicted weather information.

Hereinafter, contents of the distribution format are described with reference to FIG. 3.

A predicted information (time) number indicated by (1) is the number of the conducted weather forecast and corresponds to the number of predicted time data. The predicted time data (2) is data on the corresponding predicted time, and includes the following data. The predicted time (3) is a time to be predicted. A mesh data number (4) is the number of the mesh data included in the weather information center 17, that is, the number of the mesh managed by the weather information center 17. The mesh data (5) is data on the individual mesh, and includes the following data. The mesh code (6) is a number assigned to each mesh. Weather forecast (7) shows whether it is sunny, cloudy, rainy, snowy or the like. Rainfall probability (8), temperature (9), humidity (10), and wind velocity (11) are indicated numerically.

In the weather information, one predicted time includes a plurality of mesh data.

Next, a description will be given on an example of a method for creating predicted information of travel time (predicted travel time) with reference to FIG. 4.

Figure 4:
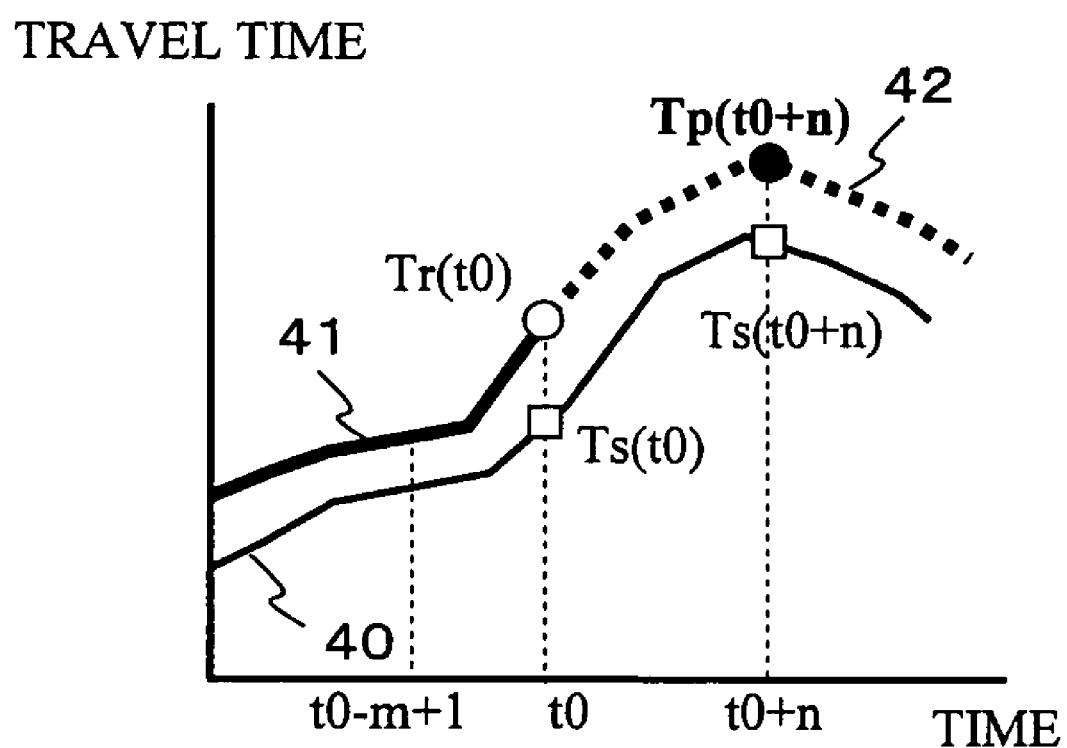
FIG. 4 shows an example of a method for creating predicted travel time.

FIG. 4 illustrates an example of a method for creating the predicted travel time.

The predicted travel time is calculated by using a time period number m that is the number of predetermined time periods in the past, which is defined by dividing a time by a predetermined interval. A difference between a statistical travel time 40 (Ts (t) in the equation (1)) and an actual travel time 41 (Tr(t)) is calculated in each time period from a time t0−m+1 to a time t0. The statistical travel time 40 is obtained from the statistically calculated travel time by averaging the travel time of the vehicle, which actually traveled through a route in the past. The actual travel time 41 is an actual travel time of the vehicle on a current day. The differences in the time periods are added together, which are then divided by the time period number m, thereby calculating an average value of the difference between the statistical travel time 40 and the actual travel time 41. The average value is then added to the statistical travel time 40 at the predicted time (t0+n) to calculate the predicted travel time 42 (Tp(t0+n)) at the predicted time. The above description is expressed by the equation 1.

[Equation 1]

$$Tp(t0 + n) = Ts(t0 + n) + \alpha \cdot \frac{1}{m} \cdot \sum_{t=t0-m+1}^{t0} \{Tr(t) - Ts(t)\} \quad (1)$$

In the equation 1, α is a predetermined constant.

A plurality of predicted travel time 42 at the predicted time (t0+n), which is Tp(t0+n) in the equation 1, are determined so that the traffic information server 13 can obtain a plurality of predicted travel times 42 with regard to a predetermined link.

[Navigation Device]

Figure 5:
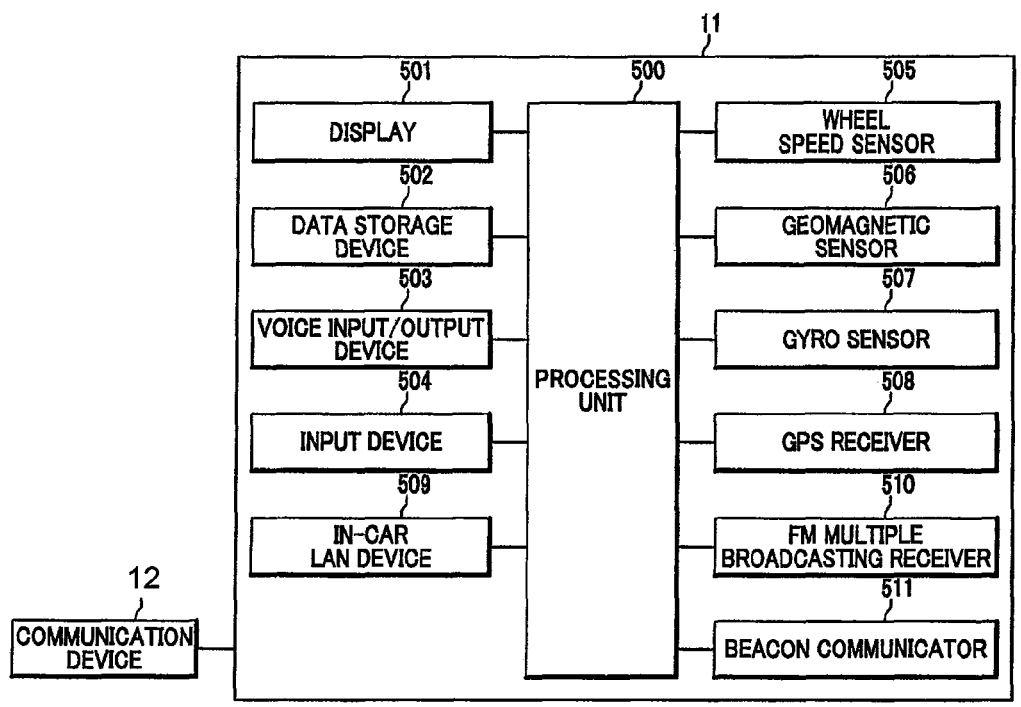
FIG. 5 schematically illustrates a configuration of the navigation device.

FIG. 5 schematically illustrates a configuration of the navigation device.

As shown in FIG. 5, the navigation device 11 includes a processing unit (data processing unit) 500, a display (display unit) 501, data storage device (traffic information storage unit, map data storage unit) 502, a voice input/output device 503, an input device (operation input device) 504, a wheel speed sensor (positioning data acquisition unit) 505, a geomagnetic sensor (positioning data acquisition unit) 506, a gyro sensor (positioning data acquisition unit) 507, a global positioning system (GPS) receiver (positioning data acquisition unit) 508, a in-car Local Area Network (LAN) device 509, a frequency modulation (FM) multiple broadcasting receiver 510, and a beacon communicator 511.

The processing unit 500 is a central unit that operates various processes, and includes a central processing unit (CPU), a random access memory (RAM) or the like. For example, the processing unit 500 calculates a current location based on data input from the various sensors 505 to 507 and the GPS receiver 508, or searches for an optimum route (recommended route), which connects the current location (departure place) and a destination designated by the user. The processing unit will be described in detail with reference to FIG. 6.

The display 501 is a unit that displays graphics data generated by the processing unit 500, and consists of, for example, a liquid crystal display.

The data storage device 502 includes a storage medium, such as a compact disk read only memory (CD-ROM), a digital versatile disk read only memory (DVD-ROM), a hard disk drive (HDD), or an integrated circuit (IC) card, and reading and writing devices for the storage medium. In the storage medium is stored various data, such as map data or the statistical traffic information, for example, the statistical travel time 40 in FIG. 4.

The map data includes the link data on each link making up a road included in a mesh area, which is defined by each mesh code that is the number assigned to each mesh. The link data includes coordinate data of two nodes (start and end nodes) of the link, type data of the road including the link (the above-mentioned link classification), link length data indicating the length of the link, regulatory speed data indicating a regulatory speed of the link, the link number of the link connected to each of the two node, intersection data, or the like. It should be noted that in the two nodes of the link, the start node and the end node are distinguished from each other so that the same road is managed as the separate links in the ascending and descending directions, respectively. However, the road may be managed as the same link in the ascending and descending directions. The map data also includes feature data (for example, names, types, and coordinate data of constructions) that is data of constructions other than roads in the corresponding mesh area.

The voice input/output device 503 converts messages generated for a user in the processing unit 500 to audio signals, and then outputs the signal. Furthermore, the voice input/output device 503 recognizes a user's voice and transfer the content of the voice to the processing unit 500.

The input device (input unit) 504 is a unit that receives instructions from a user. The input device is formed by a hard switch, such as a scroll key or a scale-reduction key, a joystick, a touch panel attached on the display 501, or the like.

The various sensors such as the wheel speed sensor 505, the geomagnetic sensor 506, and the gyro sensor 507, and the GPS receiver 508 are used in the navigation device 11 to calculate the current location of the vehicle (vehicle location).

The wheel speed sensor 505 measures a travel distance by the product of the circumference of the wheel and the number of rotations of the wheel to be measured. Furthermore, the wheel speed sensor 505 measures an angle of traverse of the vehicle by the difference of the rotation speed between a pair of the wheels (left and right wheels). The geomagnetic sensor 506 senses the magnetic field of the earth to detect the direction, in which the vehicle is traveling. The gyro sensor 507 is formed by an optical fiber gyro or a vibration gyro, and detects an angle of traverse of the vehicle. The GPS receiver 508 receives signals from GPS satellites and measures a distance between the vehicle and the GPS satellites and a rate of change of the distance by using three or more satellites, so that the GPS receiver 508 measures the vehicle location and the moving speed and direction of the vehicle.

In the present embodiment, it is therefore possible to measure the current location by the wheel speed sensor 505 or the like, as well as by the GPS receiver 508.

The in-car LAN device 509 receives various data on the vehicle on which the navigation device 11 is mounted, for example, whether a door is open or closed, whether a light is left on, engine condition, fault diagnosis result, or the like.

The FM multiple broadcasting receiver 510 receives the traffic information and the weather information transmitted from a FM broadcasting station as FM multiple broadcasting signals.

The beacon communicator 511 receives the detailed traffic information, which includes the link travel time data, transmitted from a beacon that is a communication device placed on a road.

Because the communication device 12 is described with reference to FIG. 1, the explanation thereof is omitted herein.

[Processing Unit]

Figure 6:
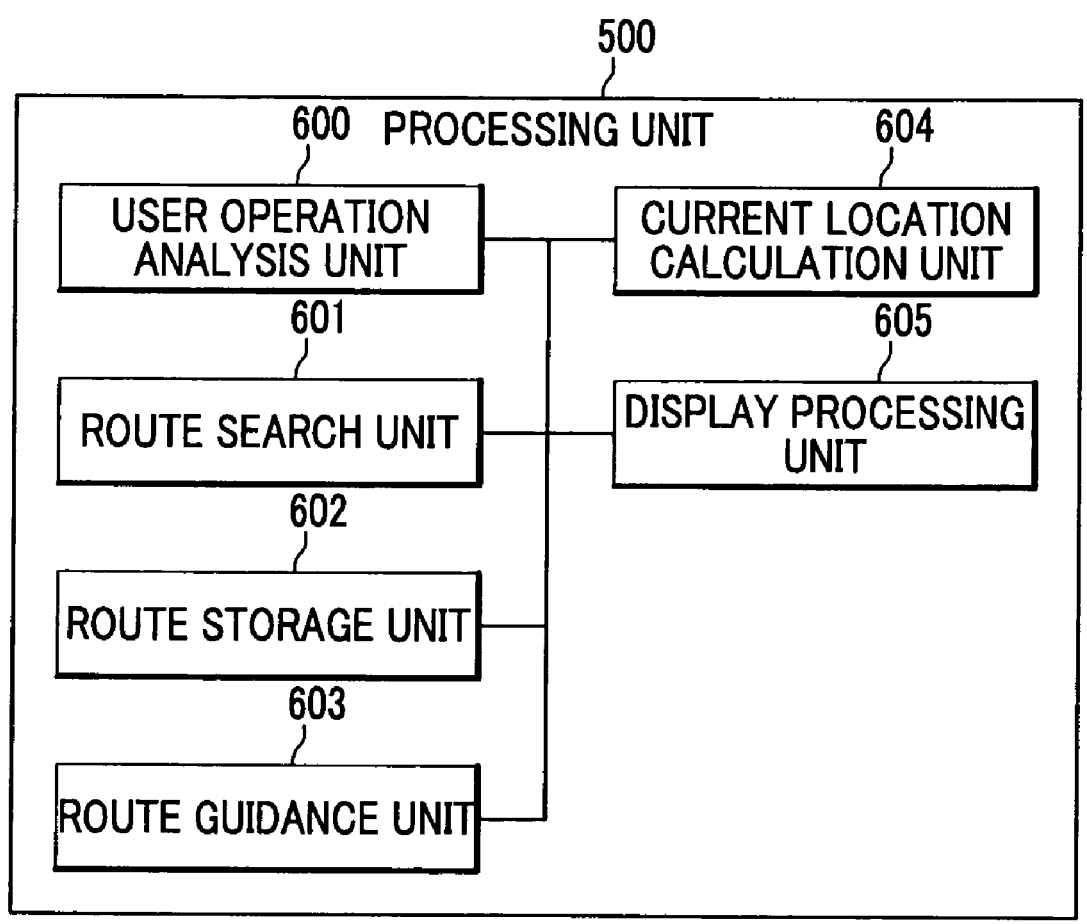
FIG. 6 schematically illustrates a configuration of the processing unit 500.

FIG. 6 schematically illustrates a configuration of the processing unit 500.

The configuration of the processing unit 500 will be described with reference to FIGS. 5 and 6.

As shown in FIG. 6, the processing unit 500 includes a user operation analysis unit 600, a route search unit (route search means) 601, a route storage unit 602, a route guidance unit 603, a current location calculation unit 604, and a display processing unit (display processing means) 605.

The user operation analysis unit 600 receives a request from the user, which is input to the input unit 504, and based on the request the user operation analysis unit 600 gives a command to each unit of the processing unit 500 to carry out the process corresponding to the request.

The route search unit 601 performs a process, such as searching for a route having the lowest cost, for example travel time, among routes connecting between the designated two points (departure place and destination) by using a route search algorithm such as the Dijkstra's algorithm. The functions of the route search unit 601 will be described with reference to flowcharts in FIGS. 9A and 9B.

The route storage unit 602 memorizes the route data searched by the route search unit 601.

The route guidance unit 603 performs the route guidance by using the route searched by the route search unit 601. For example, the route guidance unit 603 compares the route data with the current location data, and instructs the user to go straight, turn right, or turn left with a voice message by means of the voice input/output device 503 before the vehicle passes through an intersection or the like. Furthermore, the route guidance unit 603 displays a route or direction to be taken by the vehicle on the map displayed on the display 501 so as to inform the user of the recommended route.

The current location calculation unit 604 regularly calculates a current location (X',Y') at which the vehicle has arrived after the vehicle started from an initial location (X, Y) by integrating respectively a distance pulse data measured by the wheel speed sensor 505 and an angular acceleration data measured by the gyro sensor 507 to obtain distance data and angular data, which are then integrated by time. The current location calculation unit 604 performs a map-matching process by using the calculation result to match the current location in a part of the link, whose geometry most fits the current location. The positioning result of the GPS receiver 508 may be used for the map-matching process instead of the calculation result.

The display processing unit 605 obtains the map data on the area displayed on the display 501 from the data storage unit 502. The display processing unit 605 generates a map drawing command to draw marks (icons) on the display 501 by using a designated map scale size and drawing method, which includes a width or type of a line or graphic forms. The marks (icons) include roads, other constructions on the road, a current location, a destination, a route, or an arrow for the route guidance. The display processing unit 605 then transmits the map drawing command to the display 501.

The navigation device 11 comprises computers, which includes a CPU, a RAM, a ROM, a HDD, or input/output interfaces. For example, a program stored in the ROM of the computer is converted into the RAM and then processed by the CPU so that each unit shown in FIGS. 5 and 6 perform operations.

[Navigation Process]

Next, operations of the navigation device 11 will be described.

A description will be given on a flow of the process in the navigation device 11 according to an embodiment of the present invention according to FIG. 7 with reference to FIGS. 5 and 6.

Figures 7, 8:
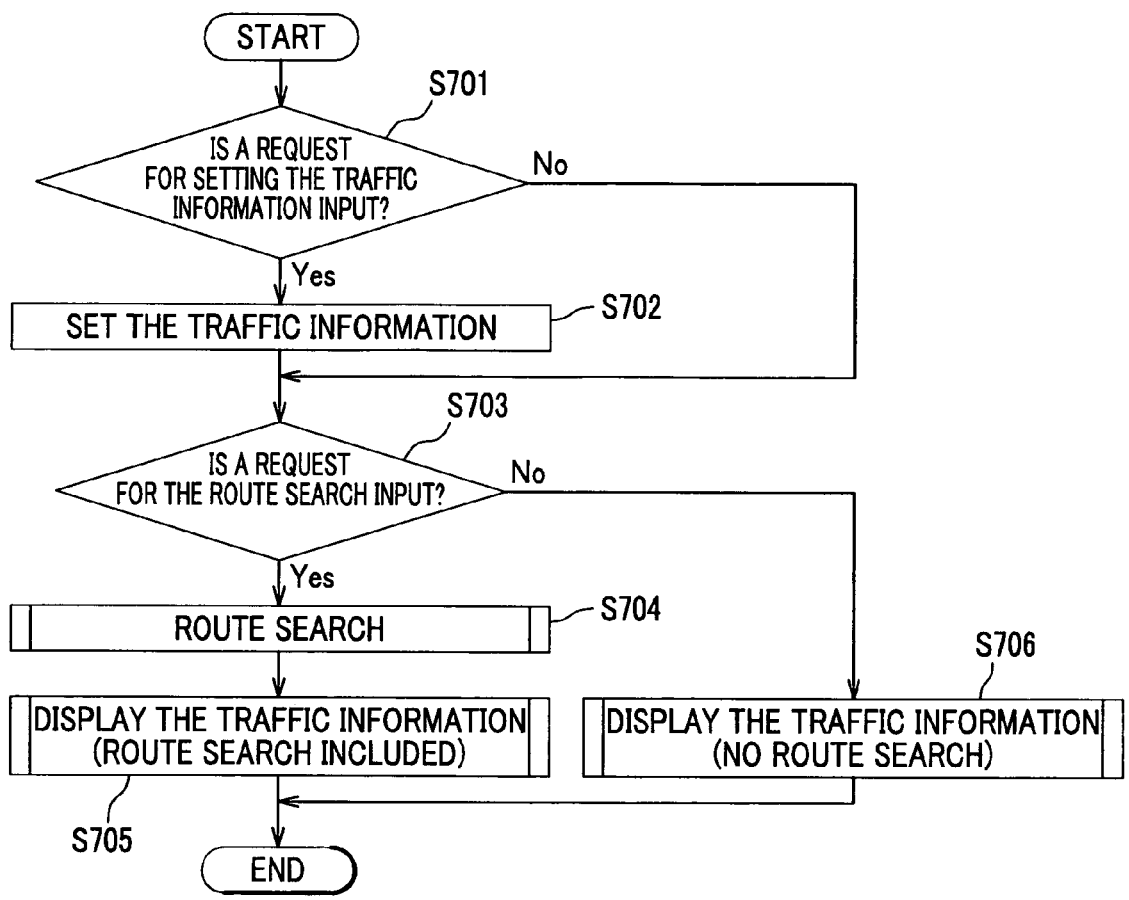
FIG. 7 is a flowchart of the process in the navigation device 11 according to the present embodiment.
FIG. 8 shows an example of the setting screen of the traffic information.

FIG. 7 is a flowchart of the process in the navigation device 11 according to the present embodiment.

When the navigation device 11 is started up, the user operation analysis unit 600 determines whether a request for setting the traffic information is input or not through the input device 504 (S701). When the request for setting the traffic information is input (Yes in S701), the user operation analysis unit 600 carries out the setting of the traffic information (S702). The user operation analysis unit 600 determines whether the request for setting the traffic information is input or not by checking whether the request signals for setting the traffic information is input or not through the input device 504.

For the setting of the traffic information in the step S702, the user operation analysis unit 600 makes the display 501 show the setting screen of the traffic information through the display processing unit 605.

FIG. 8 shows an example of the setting screen of the traffic information. On the setting screen are displayed choices for the available traffic information, which can be selected by the input device 504. The traffic information to be selected includes, for example, "statistical traffic information (no downloading)", "current traffic information (downloading included)", "predicted traffic information (downloading included)". In the following description, the statistical traffic information, the current traffic information, and the predicted traffic information are collectively referred to as the traffic information. When one of the choices of the traffic information on the display 501 is selected via the input device 504, the data on the selected traffic information is input to the user operation analysis unit 600 through the display processing unit 605. It should be noted that the current traffic information is the traffic information at the present time. The current traffic information is distributed from the traffic information center 16 to the traffic information server 13 via the network 15, and is stored in the traffic information server 13.

If the request signals for setting the traffic information is not input after the setup of the navigation device 11 (No in S701), the process then goes to the step S703.

Next, the user operation analysis unit 600 determines whether a request for the route search is input or not from the user through the input device 504 (S703).

Specifically, the user operation analysis unit 600 analyzes and determines whether the request signals for the route search is input or not to the user operation analysis unit 600 through the input device 504.

When a request for the route search is input (Yes in S703), the user operation analysis unit 600 transmits the traffic information obtained in the step S702 to the route search unit 601, and then the route search is carried out (S704). The details of the route search process will be given later with reference to FIGS. 9A and 9B.

Then, the process of displaying the traffic information (the route search included) is carried out in the step S705. The process of displaying the traffic information (the route search included) will be described in detail later with reference to FIGS. 11 and 12.

When a request for the route search is not input (No in S703), the user operation analysis unit 600 transmits the data on the traffic information selected in the step S702 to the display processing unit 605, and the process goes to the step S706 to display the traffic information (no route search). A detailed description will be given on the process to display the traffic information (no route search) later with reference to FIGS. 13 and 14.

In the case that the process in the step S702 is not carried out, the statistical traffic information stored in the data storage device 502 may be used as the traffic information to perform the process in the steps S704 and S705, or an average speed of the vehicle, which is calculated by the data input from the wheel speed sensor 505, may be used to carry out the process in the steps S704, S705, and S706.

In the present embodiment, the predicted traffic information is used to perform the process in the steps S704 to S706.

[Route Search Process]

The route search process will be described according to FIGS. 9A and 9B with reference to FIGS. 1, 5, 6, and 7.

Figure 9A:
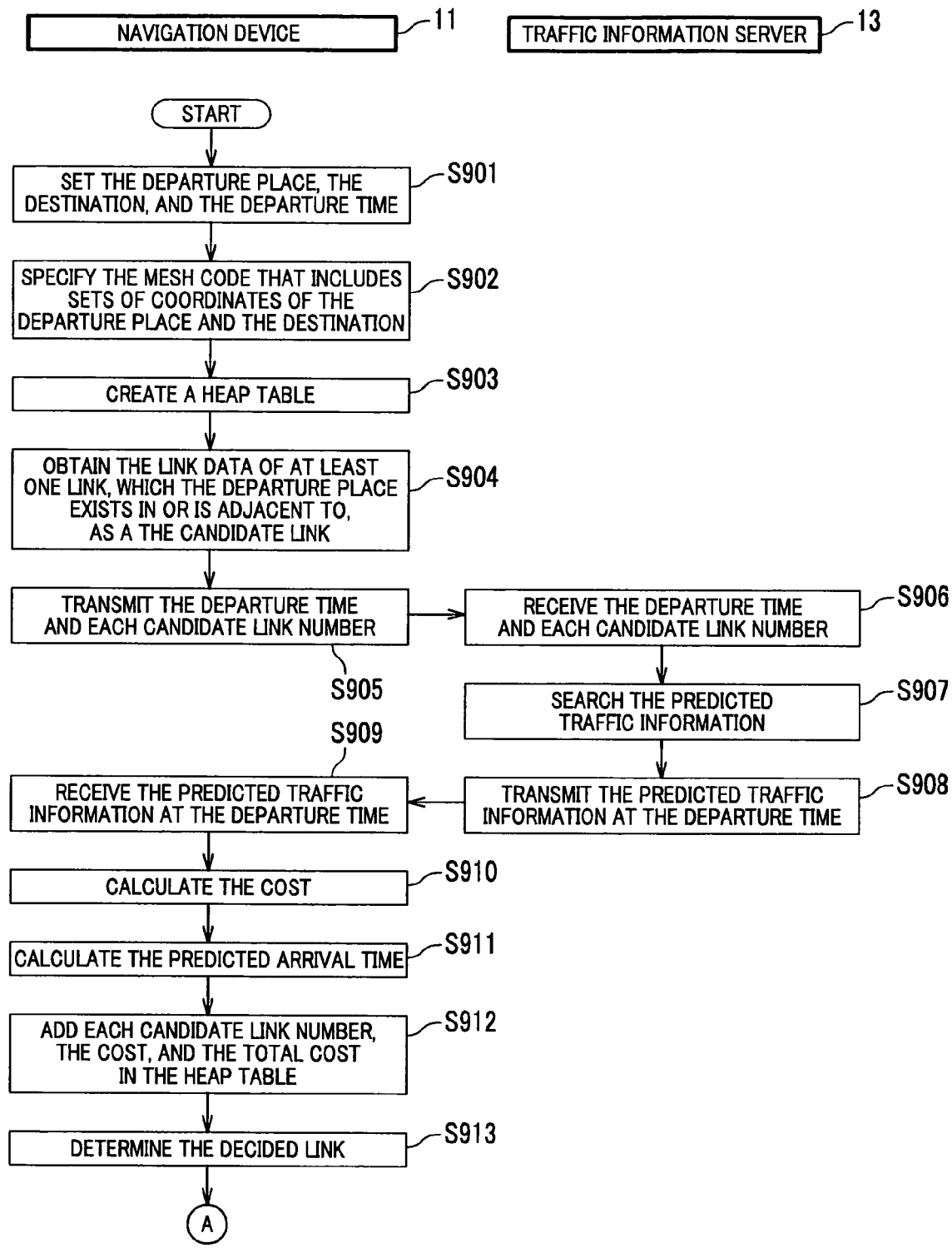
FIG. 9A is a flowchart of the process of the route search by using the predicted traffic information (the first process)
Figure 9B:
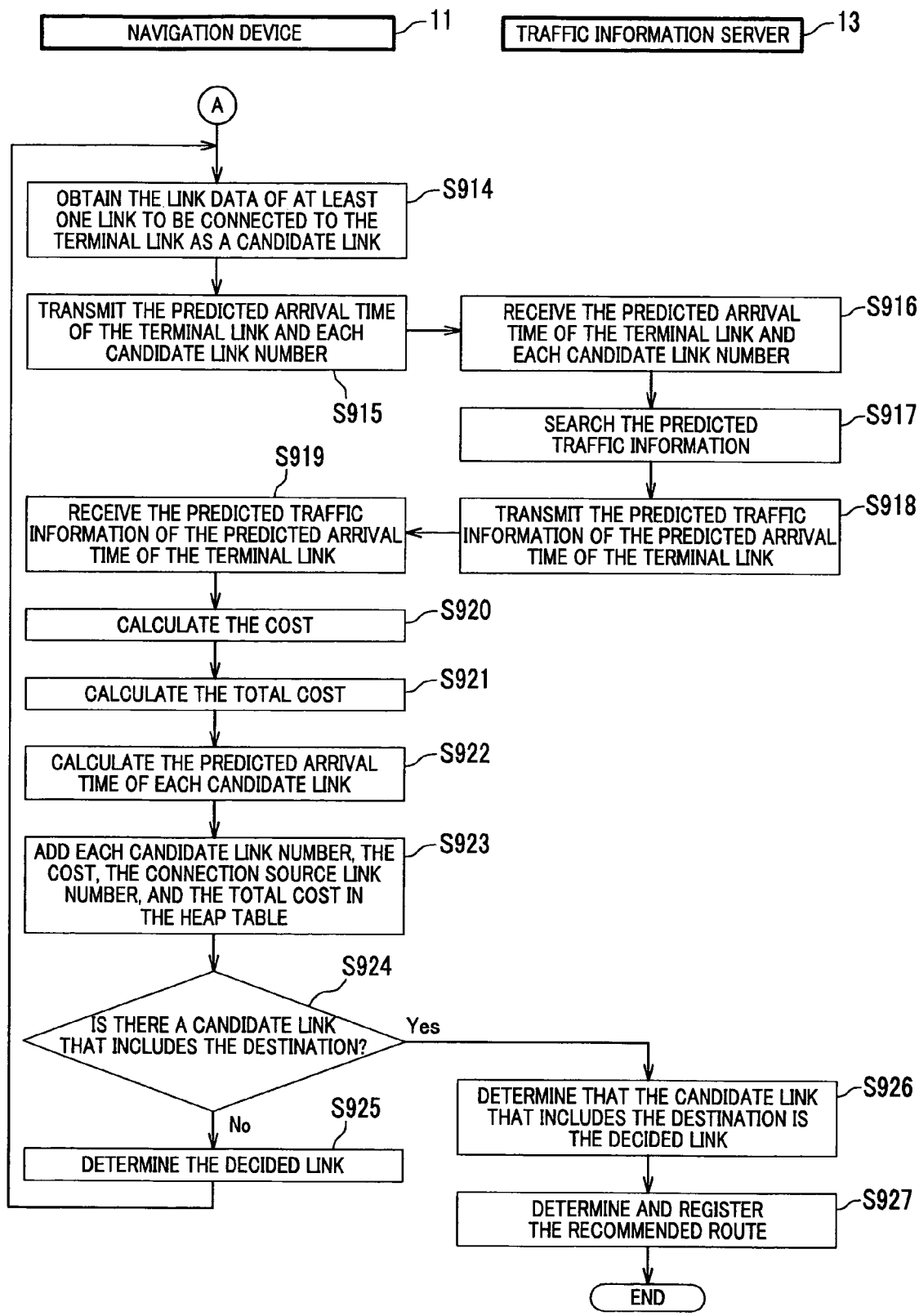
FIG. 9B is a flowchart of the process of the route search by using the predicted traffic information (the second process)

FIGS. 9A and 9B are flowcharts of the route search process by using the predicted traffic information.

The steps S901 to S913 in FIG. 9A include the process of the first link, i.e. the link including the departure place, on the recommended route formed as a result of the route search. The steps S914 to S925 in FIG. 9B include the process of the second and later links. The steps S926 and S927 in FIG. 9B include the process to determine the recommended route.

The present embodiment will be described based on the assumption that the predicted traffic information is selected in the step S702 in FIG. 7.

(Input Conditions for the Route Search)

The user operation analysis unit 600 sets a departure place, a destination, and a departure time (S901). The departure place is usually set to the current location determined by the current location calculation unit 604. However, an arbitrary point may be input to the user operation analysis unit 600 through the input device 504 by the user to be set as the departure place. The current location calculation unit 604 regularly calculates a current location (X', Y') at which the vehicle has arrived after the vehicle started from an initial location (X, Y) by integrating respectively a distance pulse data measured by the wheel speed sensor 505 and an angular acceleration data measured by the gyro sensor 507 to obtain distance data and angular data, which are then integrated by time. The current location calculation unit 604 performs a map-matching process by using the calculation result to match the current location in a part of the link, whose geometry most fits the current location, thereby calculating the current location as required. The positioning result of the GPS receiver 508 may be used for the map-matching process instead of the calculation result.

The departure place is a starting point of the route upon the route search. The data on the departure place specifically includes a coordinate of the departure place, i.e. degrees of latitude and longitude.

The user operation analysis unit 600 sets a destination based on a user's instruction. The user sets the destination through the input device 504. The destination is specifically a coordinate of the destination. The user operation analysis unit 600 sets a departure time. When the current time is set as the departure time, the departure time is set by using an unshown inner timer or the time data obtained from the GPS receiver 508. Otherwise, the user sets the departure time through the input device 504. The user operation analysis unit 600 then transmits the data on the departure place, the destination, and the departure time to the route search unit 601.

(Specify the Mesh Code and Create the Heap Table)

The route search unit 601 specifies the mesh code that includes coordinates of the departure place and the destination, based on the coordinates of the departure place and the destination transmitted from the user operation analysis unit 600 (S902).

The route search unit 601 then creates a heap table (S903). A heap table is a table to register the link data of a candidate link, together with the total cost (total travel time) taken from the departure place to an end node of the candidate link.

(Heap Table)

FIG. 10 is a chart illustrating an example of the heap table.

As shown in FIG. 10, a record is registered in the heap table for each candidate link. The record corresponds to a line in the chart in FIG. 10. The record includes fields, each designed to register the link number of the candidate link (hereinafter referred to as a candidate link number), the cost (travel time) of the candidate link, a connection source link number that is a link number of a terminal link, to which the candidate link is to be connected, the total cost (total travel time) to be taken from the departure time to the end node of the candidate link, and a decision flag that shows whether the candidate link is set as the decided link or not in the steps S913 and S925, which will be described later.

The heap table created in the step S903 of FIG. 9A has blank fields, where the above-mentioned data, such as the cost, is not input.

(Process on the First Link)

Referring back to FIG. 9A, the route search unit 601 obtains the link data of at least one link, which the departure place exists in or is adjacent to, as the candidate link from the map data stored in the data storage device 502 (S904).

(Search and Obtain the Predicted Traffic Information)

The route search unit 601 transmits the departure time and each candidate link number to the traffic information server 13 through the communication device 12, the base station 14, and the network 15, and requests the traffic information server 13 to transmit the predicted traffic information of the departure time (S905).

The traffic information server 13 receives the departure time and each candidate link number (S906), and then searches the predicted traffic information based on the received candidate link number and departure time (S907). In this instance, the traffic information server 13 searches the predicted traffic information having the latest information creation time that is indicated by (1) as shown in FIG. 2. The traffic information server 13 transmits the predicted traffic information of the departure time to the navigation device 11 through the network 15, the base station 14, and the communication device 12 (S908).

Next, the navigation device 11 receives the predicted traffic information of the departure time with regard to each candidate link from the traffic information server 13 (S909).

(Calculate the Cost and the Predicted Arrival Time)

After receiving the predicted traffic information of the departure time with regard to each candidate link, the navigation device 11 calculates the cost (travel time) of each candidate link based on the travel time in the predicted traffic information obtained by the route search unit 601 (S910).

Further, the route search unit 601 calculates the predicted arrival time, on which the vehicle arrives at the end node of each candidate link, based on the cost calculated in the step S910 (S911). In the present embodiment, the cost calculated in the step S910 is added to the departure time set in the step S901, thereby calculating the predicted arrival time.

(Register in the Heap Table, and Determine the Decided Link)

The route search unit 601 adds each candidate link number, the cost, and the total cost in the heap table (S912). The cost calculated in the step S910 is added in the heap table as the total cost. Because these candidate links are to be the first link, the connection source link number remains blank.

Next, the route search unit 601 selects the candidate link having the lowest total cost among a plurality of candidate links so as to determine the decided link (S913). The decided link is a link that is determined to include the recommended route, and the field of the decision flag in the heap table is marked with "decided". The links that are not determined as the decided link is marked with "undecided". The link determined as a decided link in this step is also a terminal link. The terminal link is the closest link to the destination among the decided links at a predetermined point of time.

(Process on the Second and Later Links)

The following process will be described with reference to FIG. 9B.

The route search unit 601 obtains the link data of at least one link to be connected to the terminal link from the data storage device 502 as a candidate link (S914). Specifically, the route search unit 601 refers to the end node of the terminal link, and searches for a link, a start node of which matches the end node of the terminal link, so as to regard such link as a candidate link.

(Search and Obtain the Predicted Traffic Information)

The route search unit 601 requests the traffic information server 13 to transmit the predicted traffic information of the predicted arrival time with regard to the terminal link through the communication device 12, the base station 14, and the network 15. The route search unit 601 then transmits the predicted arrival time of the terminal link and each candidate link number to the traffic information server 13 (S915).

The traffic information server 13 receives the predicted arrival time of the terminal link and each candidate link number (S916), and searches the predicted traffic information based on the predicted arrival time and each candidate link number (S917). The traffic information server 13 searches the predicted traffic information of the predicted arrival time with regard to the terminal link, and then transmits the predicted traffic information of the predicted arrival time with regard to the terminal link to the navigation device 11 through the network 15, the base station 14, and the communication device 12 (S918).

Next, the navigation device 11 receives the predicted traffic information of the predicted arrival time of the terminal link with regard to each candidate link from the traffic information server 13 (S919).

(Calculate the Cost, the Total Cost, and the Predicted Arrival Time)

After receiving the predicted traffic information of the predicted arrival time of the terminal link with regard to each candidate link, the navigation device 11 calculates the cost (travel time) of each candidate link based on the travel time in the predicted traffic information obtained by the route search unit 601 (S920).

The route search unit 601 calculates the total cost (total travel time) with regard to each candidate link (S921). Specifically, the route search unit 601 adds a value of the cost calculated in the step S920 to a value of the total cost of the terminal link in the heap table so that the total cost of the candidate link is calculated.

The route search unit 601 adds the total cost calculated in the step S921 to the departure time set in the step S901 so as to calculate the predicted arrival time of each candidate link (S922).

(Register into the Heap Table)

The route search unit 601 adds each candidate link number, the cost, the connection source link number, and the total cost in the heap table (S923). p (Determine Whether the Destination is Included or not)

The route search unit 601 determines whether there is a candidate link that includes the destination among the present candidate links (S924). Specifically, the route search unit 601 specifies the mesh code that includes the candidate link, and compares a set of coordinates of each point in the candidate link with a set of coordinates of the destination set in the step S901 so as to determine whether the set of coordinates of each point in the candidate link and the set of coordinates of the destination are identical to each other at any point or close to each other within a predetermined margin.

(Determine the Decided Link)

When the route search unit 601 determines that there is no candidate link that includes the destination among the present candidate links (No in S924), the process goes to the step S925.

In the step S925, the total cost of each candidate link stored in the heap table is searched to select the candidate link having the lowest total cost. The selected candidate link is then determined to be a newly decided link. The decided link is marked with "decided" in a field of the decision flag in the heap table. The candidate link, which is not the decided link, is marked with "undecided". The link determined to be the decided link in this step is also a latest terminal link.

(Determine the Decided Link)

A description will now be given on the process in the step S924 again.

When the route search unit 601 determines that there is a candidate link that includes the destination among the present candidate links (Yes in S924), the route search unit 601 specifies the candidate link and the process goes to the step S926.

In the step S926, the candidate link, which is determined to include the destination in the step S924, is determined to be the decided link. The decided link is marked with "decided" in a field of the decision flag in the heap table. The candidate link, which is not the decided link, is marked with "undecided".

(Determine and Register the Recommended Route)

The route search unit 601 determines the link, in which a field of the connection source link number in the heap table is blank and the decision flag is marked with "decided", as the first link. The route search unit 601 refers to the connection source link number and the decision flag in the heap table, thereby obtaining the links in series. The obtained links form the recommended route in sequence, which is then decided as a recommended route. Further, the route search unit 601 transmits the determined recommended route and the heap table to the route storage unit 602, and the route storage unit 602 stores the recommended route and the heap table to be registered therein (S927).

(Modification of the Embodiment of the Present Invention)

In the embodiment of the present invention, the description will be give to the case where the predicted traffic information is selected through the screen shown in FIG. 8 in the step S702 of FIG. 7. However, the present invention is not limited to that case. The present invention can be applied to the case where the current traffic information or the statistical traffic information is selected in the step S702.

When the current traffic information is selected in the step S702 of FIG. 7, the route search unit 601 transmits each candidate link number to the traffic information server 13 via the communication device 12, the base station 14, and the network 15 to request for the transmission of the current traffic information of the corresponding link in the steps S905 and S915. After receiving each candidate link number in the steps S906 and S916, the traffic information server 13 searches the current traffic information based on each candidate link number (S907, S917), and transmits the current traffic information to the route search unit 601 via the network 15, the base station 14, and the communication device 12 (S908, S918). Then, the cost is calculated based on the current traffic information in the steps S910 and S920.

When the statistical traffic information is selected in the step S702 of FIG. 7, the route search unit 601 does not communicate with the traffic information server 13. That is, the process in the steps S905 to S909 and S915 to S919 are not carried out. Instead, the route search unit 601 obtains the statistical traffic information of the departure time in each candidate link from the data storage device 502. The cost of the corresponding link in the steps S912 and S923 can be determined from the obtained statistical traffic information.

When the request for setting the traffic information is not input (No in S701), i.e. the process is not carried out in the step S702, it is determined in advance that the statistical traffic information is used as the traffic information, which is a default process, and the process in the steps S901 to S927 are carried out. Furthermore, the route search unit 601 calculates the present speed of the vehicle from an input of the wheel speed sensor 505 or the like, and calculates the travel time of each candidate link based on the link length obtained from the link data of each candidate link and the calculated present speed of the vehicle. The calculated travel time may be used instead of the traffic information to perform the process in the steps S901 to S927.

[Traffic Information Display Process (Route Search Included)]

Next, a description will be given on the process for displaying the traffic information including the route search (S705 in FIG. 7) according to FIGS. 11 and 12 with reference to FIGS. 5 and 6.

Figure 11:
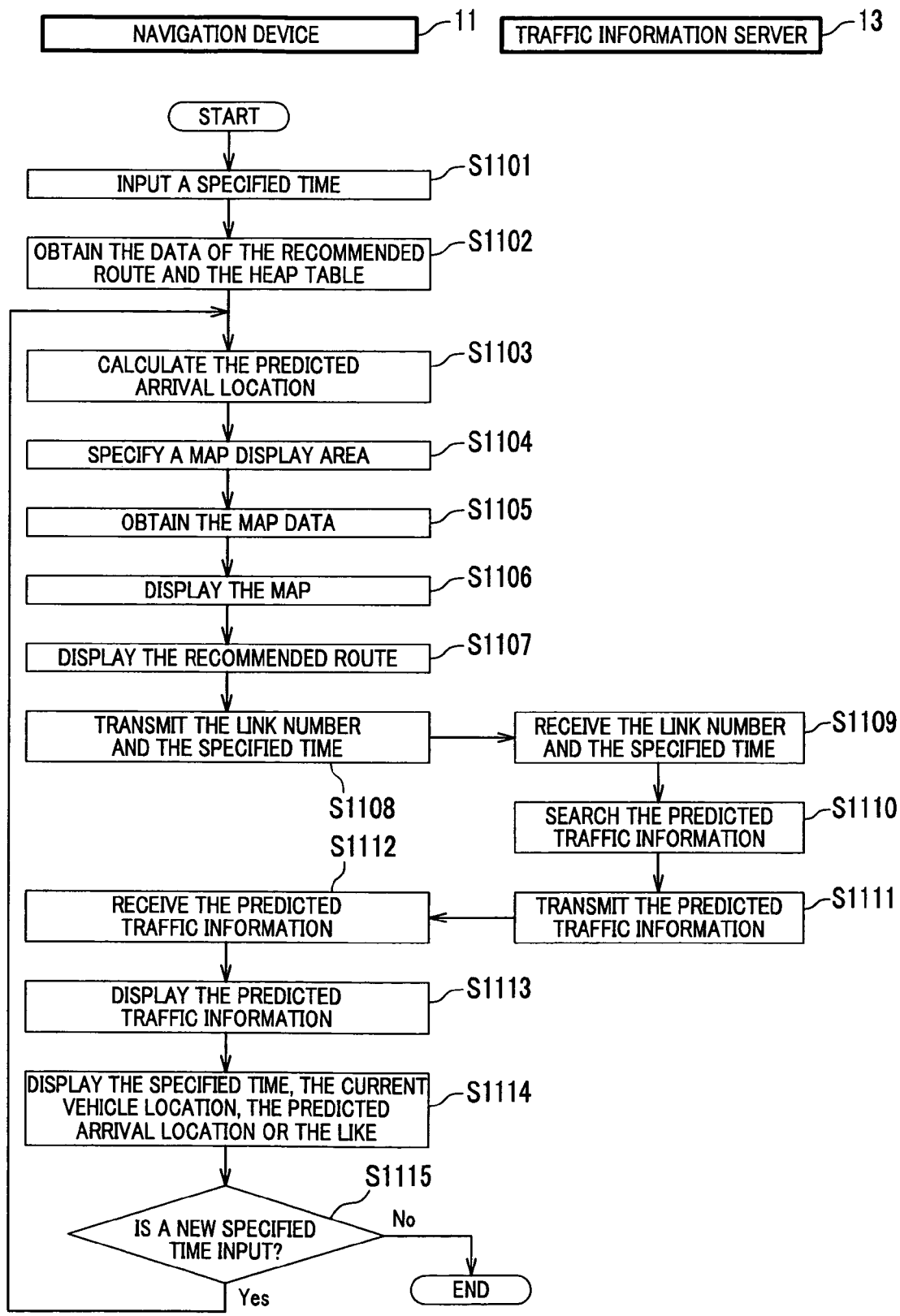
FIG. 11 is a flowchart of the process for displaying the traffic information of a specified time on the screen, which includes the route search.

FIG. 11 is a flowchart of the process for displaying the traffic information of a specified time on the screen, which includes the route search.

(Input a Specified Time, Obtain the Recommended Route and the Heap Table)

A specified time, of which the user wants to know the information such as traffic congestion, is input to the display processing unit 605 through the input device 504 (S1101). The specified time is input to the display processing unit 605 by user's selection of the buttons 1205 to 1210 for moving the time forward or backward, which will be described later with reference to FIG. 12.

Next, the display processing unit 605 obtains the data on the recommended route and the heap table from the route storage unit 602, in which the recommended route and the heap table are stored in the step S927 (S1102).

(Calculate the Predicted Arrival Location and Specify the Map Display Area)

The display processing unit 605 calculates the predicted arrival location where the vehicle arrives at the specified time, based on the data on the recommended route and heap table (S1130). A method of calculating the predicted arrival location will be described later in detail.

The display processing unit 605 specifies an area of a map to be displayed based on the predicted arrival location calculated in the step S1103 (S1104). The map display area may be changed, for example, by the map scale size (for instance, 1/50000 or the like) through the input device 504 (see FIG. 5), or may be determined by the user by means of a scroll bar or the like attached on the display screen. The map display area may be set automatically by the display processing unit 605. In this case, for example, the map display area may include both the departure place and the destination, or both the vehicle location and the predicted arrival location. The map display area may include a predetermined area centered on the predicted arrival location.

(Obtain the Map Data, and Display the Map)

The display processing unit 605 obtains the map data on the area ranging from the predicted arrival location to the area specified in the step S1104 from the data storage device 502 (S1105) to acquire the link data in the map data.

The display processing unit 605 makes the display 501 show a map based on the obtained map data (S1106).

(Display the Recommended Route)

The display processing unit 605 makes the display 501 show the recommended route within the map area specified in the step S1104 based on the data on the recommended route obtained in the step S1102 (S1107).

(Search and Obtain the Predicted Traffic Information)

The display processing unit 605 transmits the link numbers of all the links within the map display area specified in the step S1104 and the specified time input in the step S1101 to the traffic information server 13 via the communication device 12, the base station 14, and the network 15 (S1108).

The traffic information server 13 receives the link numbers of all the links within the map display area and the specified time (S1109), based on which the traffic information server 13 searches the predicted traffic information (S1110), and transmits the corresponding predicted traffic information to the navigation device 11 via the network 15, the base station 14, and the communication device 12 (S1111).

The navigation device 11 receives the predicted traffic information from the traffic information server 13 (S1112). The display processing unit 605 processes the predicted traffic information and then make the display 501 show the predicted traffic information in association with the links on the map (S1113). A method of displaying the predicted traffic information will be described later in detail with reference to FIG. 12.

The display processing unit 605 makes the display 501 show the specified time, the vehicle location, the predicted arrival location where the vehicle arrives at the specified time, or the like (S1114).

The display processing unit 605 determines whether a new specified time is input therein or not (S1115). The new specified time is input to the display processing unit 605 in the same manner as in the step S1101. The display processing unit 605 determines whether the new specified time is input therein or not by checking whether the input signals are input therein or not.

When the display processing unit 605 determines that the new specified time is not input thereto (No in S1115), the process terminates.

When the display processing unit 605 determines that the new specified time is input thereto (Yes in S1115), the process returns to the step S1103.

In the present embodiment, the predicted traffic information to be displayed is obtained from the traffic information server 13. However, the present invention is not limited to that case. In the process of the route search in FIGS. 9A and 9B, the heap table is provided with a field of the predicted traffic information in each link, and the predicted travel time in the predicted traffic information is stored in the field in the steps S912 and S923 of FIGS. 9A and 9B, thereby making it possible to eliminate the download of the predicted traffic information from the traffic information server 13.

When the buttons are continuously pressed down to shift the specified time forward or backward, which is described later with reference to FIG. 12, the process in the steps S1101 to S1115 are continuously performed so that it is possible to see the predicted arrival location of the vehicle and the traffic information, which changes by the minute, all together as if it were a moving graphic data.

(An Example of the Screen)

Figure 12:
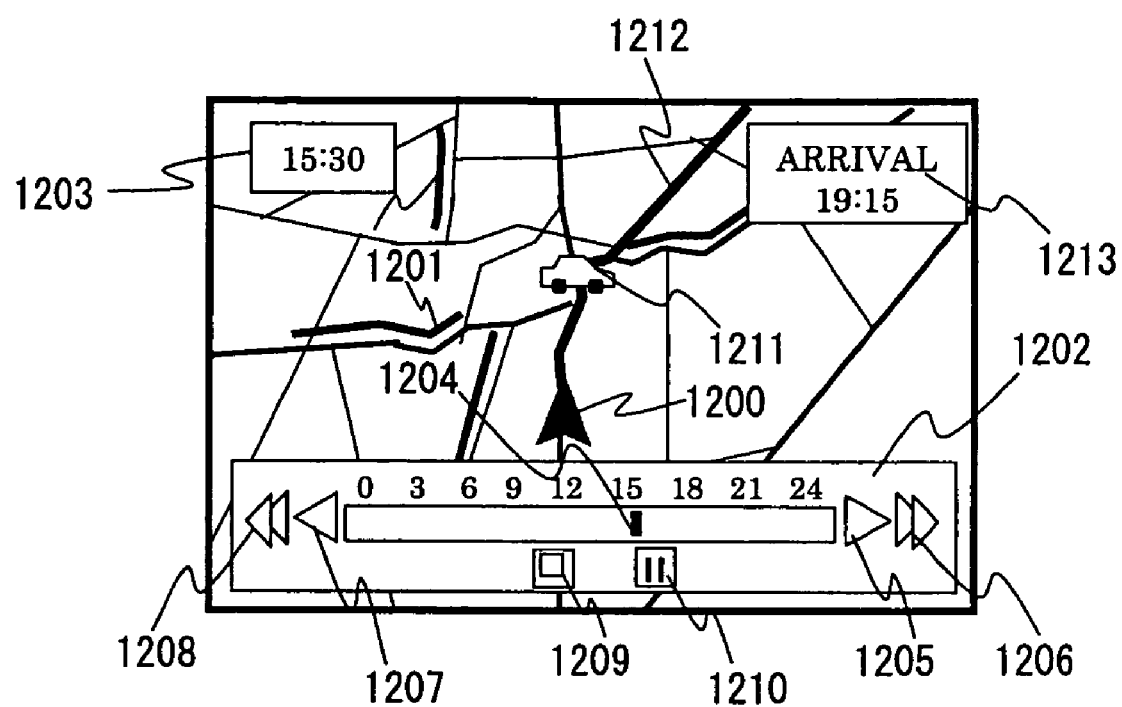
FIG. 12 shows an example of the screen for displaying the traffic information of a specified time, which includes the route search.

FIG. 12 shows an example of the screen for displaying the traffic information of the specified time, which includes the route search.

As shown in FIG. 12, the screen example for displaying the traffic information includes the vehicle location 1200, the traffic information 1201 to be displayed, a time specification area 1202 to specify a time, of which the traffic information is to be displayed, the specified time (timestamp) 1203, 1204 of the traffic information to be displayed, the forward button 1205, the fast-forward button 1206, the backward button 1207, the fast-backward button 1208, a button 1209 to start or end the forward or backward operation, and a button 1210 to suspend the forward or backward operation or cancel the suspension. Each button may be configured such that, once the button is selected, the corresponding operation is continuously performed. It is, therefore, possible to update the display automatically without continuously pressing down the button.

Furthermore, the screen example for displaying the traffic information includes the predicted arrival location 1211 where the vehicle arrives at the specified time, the recommended route 1212, and the predicted arrival time 1213 to the set destination.

The traffic information 1201 is formed by imaging the degree or the length of the traffic congestion in the predicted traffic information (traffic information in claim 1), and the traffic information is indicated, for example, in a line along the corresponding link. The traffic information 1201 is displayed with different patterns of lines (continuous or broken line) or colors according to the degree of the traffic congestion, or different lengths of the line according to the length of the traffic congestion. When no traffic congestion degree or traffic congestion length is obtained, the route search unit 601 may determine the average speed of the vehicle from the travel time data and the link length, and then determine the traffic congestion degree according to the average speed. In this case, the length of the traffic congestion may be equal to the link length.

An icon showing the predicted arrival location 1211 may be changed according to the predicted traffic information as follows.

The display processing unit 605 obtains the traffic congestion degree in the predicted traffic information on the link including the predicted arrival location 1211 at the specified time 1203, and changes the icon according to the predicted traffic congestion degree. For example, when the predicted traffic congestion degree shows heavy congestion, the icon is changed to the red based color one to show the heavy congestion. When the predicted traffic congestion degree shows moderate congestion, the icon is changed to the orange based color one to show the moderate congestion. When the predicted traffic congestion degree shows no congestion, the icon is changed to the green or blue based color one to show smooth traffic.

When there is a short time interval with which the time is shifted forward to the specified time 1203, it is sufficient to focus only on the link including the predicted arrival location 1211. When there is, however, a relatively long time interval, the predicted arrival location 1211 moves largely and therefore displaying the predicted traffic information locally makes it difficult to see the traffic situation on the way of the route. For this reason, the predicted traffic information may be used with regard to not only the link including the predicted arrival location 1211 but also the link adjacent to the predicted arrival location 1211 on the recommended route 1212.

The link adjacent to the predicted arrival location 1211 on the recommended route 1212 may be selected from the links, the links within the range of a predetermined distance from the predicted arrival location, the links within the range of the predetermined number of the links, or all of the links included from the predicted arrival location of the last specified time to that of the next specified time. In this case, the predicted traffic information of a plurality of links is used, and therefore the icon showing the predicted arrival location 1211 may be changed, for example, according to the representative value, which represents the predicted traffic information of the plurality of links by a simple average value, a weighted average value in which each link length is added, or a medium value. The predicted arrival location 1211 should not be limited to the icon, but may be any image or character that is recognizable by users. In any case, the display pattern of the icon may be changed according to the predicted traffic information of the specified time 1203.

When a user selects the button 1209 on the screen displaying the time specification area 1202, the time shifts automatically at a constant speed (predetermined speed), starting from the departure time (it is the same as when the user selects the button 1205), thereby setting a specified time. Accordingly, the specified time 1203, 1204 of the traffic information to be displayed is changed, and the traffic information 1201 is displayed according to the specified time. When either of the buttons 1205 to 1208 is selected while displaying the traffic information 1201 of the specified time, the specified time 1203, 1204 proceeds forward or backward (referred to as time shifting) depending on the selected button, thereby displaying the traffic information 1201 corresponding to the specified time.

The button 1210 is selected to temporarily stop the time shifting of the specified time, and the button 1210 is selected again to restart the time shifting from the status just before the temporary stop. The selection of the button 1209 returns the specified time to the initial departure time and terminates the time shifting.

With the above-mentioned process, the user need not perform complicated operations, and can see the traffic information, which changes by the minute, as if it were a moving graphic data. It is also possible for a user to see the route being searched on the display to avoid the traffic congestion, and to understand the reason the recommended route is selected in detail. The display location of the predicted arrival location 1211 is updated on the map according to the changing specified time. However, it is possible to scroll the map display screen and the traffic information with the display location of the predicted arrival location 1211 fixed in the vicinity of a predetermined location on the display screen of the display 501.

[Traffic Information Display Process (No Route Search Included)]

A description will be given on the process for displaying the traffic information of a specified time on the screen, where no route search is done (in the step S706 in FIG. 7) with reference to FIGS. 5 and 6 as well as 13 and 14.

Figure 13:
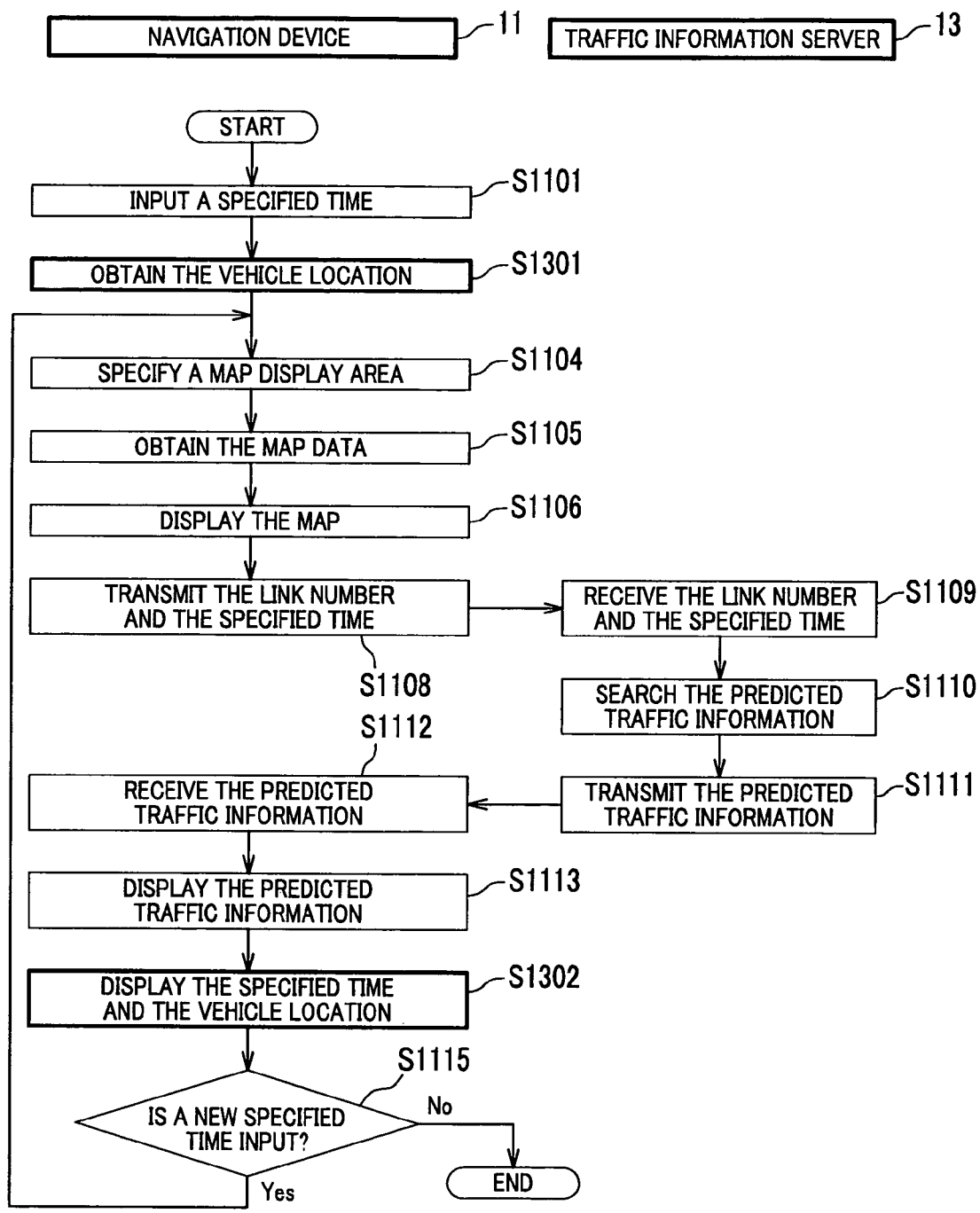
FIG. 13 is a flowchart of the process for displaying the traffic information of a specified time on the screen, which includes no route search

FIG. 13 is a flowchart of the process for displaying the traffic information of the specified time on the screen where no route search is done.

With reference to FIG. 13, a description will be given on a flow of the process for displaying the traffic information of a specified time on the screen where no route search is done.

A description is omitted for the process in the steps S1101, S1104 to S1106, S1108 to S1113, and S1115 because these processes are the same as those explained in FIG. 11.

In the step S1301, the process is carried out to obtain the location of a user's vehicle. Specifically, the display processing unit 605 obtains the vehicle location from the current location calculation unit 604. The current location calculation unit 604 calculates the vehicle location in the above-mentioned manner.

In the step S1302, the display processing unit 605 makes the display 501 show the specified time and the vehicle location. The step S1302 is different from the step S1114 in FIG. 11 in that the predicted arrival location is not displayed in S1302.

Figure 14:
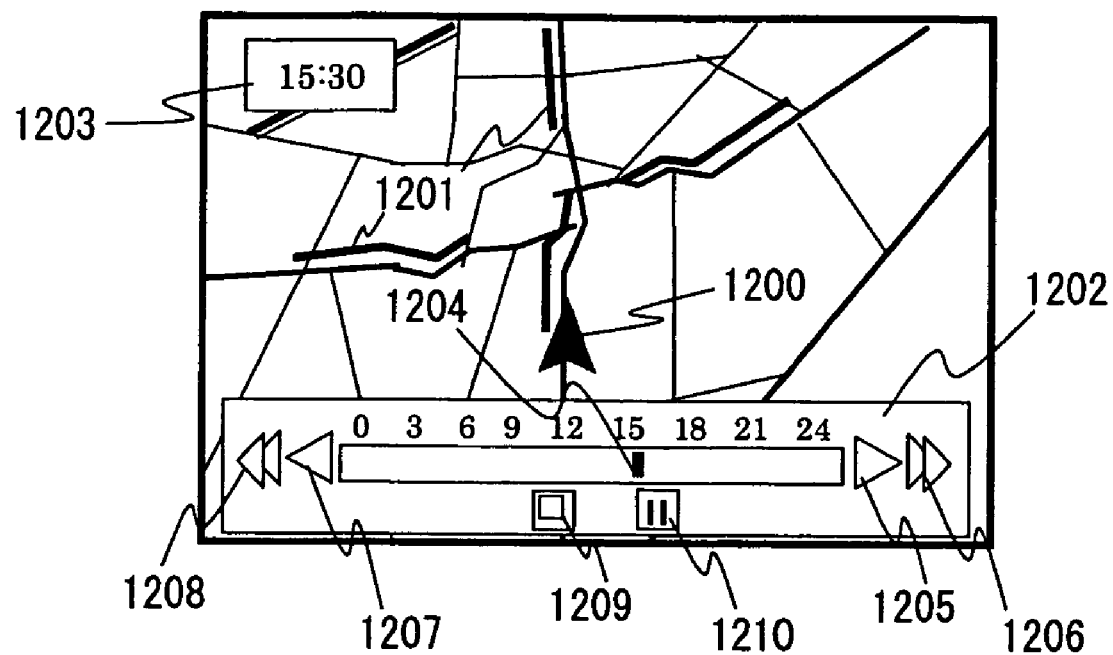
FIG. 14 shows an example of the screen showing the traffic information of the specified time, which includes no route search.

When the buttons are continuously pressed down to shift the specified time forward or backward by the operation of the screen shown in FIG. 14, the process in the steps S1101 to S1115 shown in FIG. 13 are continuously carried out so that it is possible for the user to see the predicted arrival location of the vehicle and the traffic information all together as if it were a moving graphic data.

(An Example of the Screen)

FIG. 14 shows an example of the screen showing the traffic information of the specified time, which includes no route search.

The same elements in FIG. 14 as those in FIG. 12 are denoted by the same reference numerals, and the explanation thereof is omitted.

The screen example of FIG. 14 is different from that of FIG. 12 in that, because the route search process is not carried out, the screen of FIG. 14 does not show the predicted arrival location 1211 of the vehicle, the recommended route 1212, or the predicted arrival time 1213 to the set destination, which are indicated in FIG. 12. The explanation for the other elements, which are the same as those in FIG. 12, is omitted.

With the above-mentioned process, the users need not carry out complicated operations, and can see the traffic information as if it were a moving graphic data.

[A Method of Calculating the Predicted Arrival Location]

A description will be given on a method of calculating the predicted arrival location of the vehicle at the specified time.

The process is carried out in the step S1103 of FIG. 11.

The display processing unit 605 determines that the predicted arrival time to each end node of a decided link n and a decided link (n+1) is T(n) and T(n+1), respectively, and an input specified time is T. Because the total travel time to the predicted arrival location is determined by subtracting the departure time from the specified time t, the display processing unit 605 searches a field of the total cost (total travel time) in the heap table so as to find n, by which the equation $T(n)<t<T(n+1)$ is formed. It is, therefore, determined that the predicted arrival location is located between the end node of the decided link n and the end node of the decided link (n+1), i.e. the predicted arrival location is located on the decided link (n+1). The display processing unit 605 then determines the detailed predicted arrival location by the method described below. The display processing unit 605 calculates an average speed V from the cost (travel time) of the decided link (n+1) in the heap table and the link length included in the link data. The display processing unit 605 then determines a distance X that the vehicle travels at an average speed V during a time period (t-T(n)), so that the predicted arrival location is determined to be where the vehicle travels the distance X from a starting point of the decided link (n+1).

When there is a long time interval with which the time is shifted forward, the detailed predicted arrival location of the vehicle in the link as described above may not be determined. The predicted arrival location may be a predetermined location in the link, such as a starting or ending point of the decided link (n+1), or a middle point in the link. It is, therefore, possible to reduce the processing load to calculate the predicted arrival location.

According to the conventional route simulation systems, the vehicle location is updated and displayed on the recommended route with changes in time by using the speed of the vehicle (vehicle speed) set by the user or the current speed of the vehicle. Such information as the traffic congestion information, which is likely to occur at a future time, is not displayed in such a system. In the embodiment of the present invention, however, the use of the predicted traffic information makes it possible to display more accurate traffic congestion information as a result of simulation.

[Filter the Traffic Information]

Next, a description will be given on a method of excluding the traffic information of the unnecessary roads and displaying the traffic information of the necessary roads only.

This process is carried out in the step S1113 of FIGS. 11 and 13 for displaying the predicted traffic information.

(Filter the Traffic Information Based on the Location Data)

In the first method, the links to be displayed in association with the traffic information are limited to the links that constitutes the recommended route. The links to be associated with the traffic information may include the links in the traveling direction of the vehicle, or the links in both the traveling direction and the opposite direction.

Figure 15:
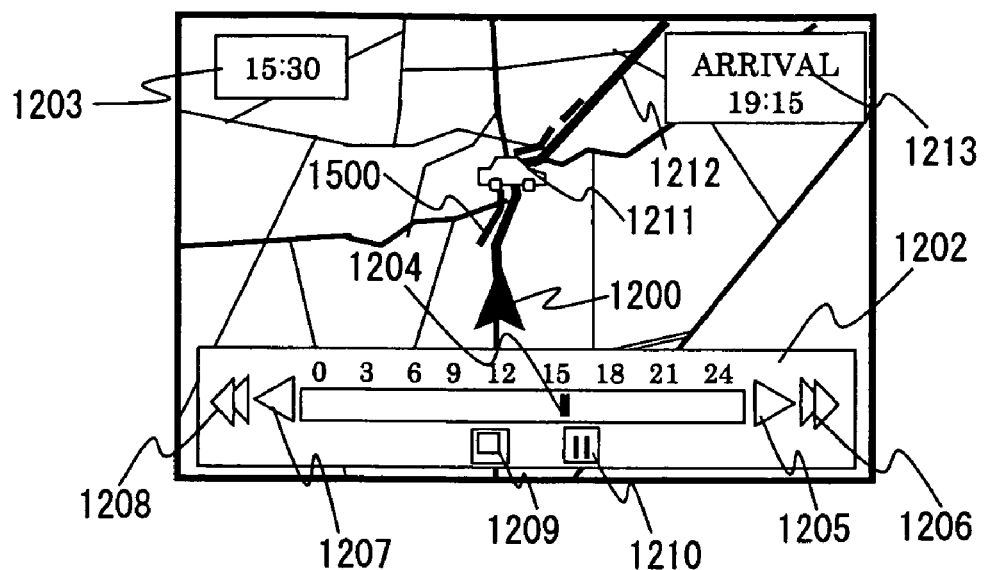
FIG. 15 shows an example of the screen wherein the second method is implemented to filter the traffic information.

In the second method, the links to be displayed in association with the traffic information are further limited than in the first method. As shown in FIG. 15, the links to be associated with the traffic information are limited to the links that constitute the recommended route, and that is included within a predetermined distance from the predicted arrival location of the specified time.

(A Screen Example in the Second Method)

FIG. 15 shows an example of the screen wherein the second method is implemented to filter the traffic information.

The screen example in FIG. 15 is different from that in FIG. 12 in that the traffic information 1500 is displayed only on the recommended route 1212 and only within a predetermined distance from the predicted arrival location 1211 in FIG. 15.

In the second method, the predicted arrival location 1211 varies with the change of the specified time (time shifting), and accordingly the link (link adjacent to the predicted arrival location) where the traffic information is displayed is changed.

In the third method, the links to be associated with the traffic information are limited to all of the links included in a predetermined area from the recommended route. In this case, the links to be displayed with the traffic information are not only the links on the recommended route.

Figure 16:
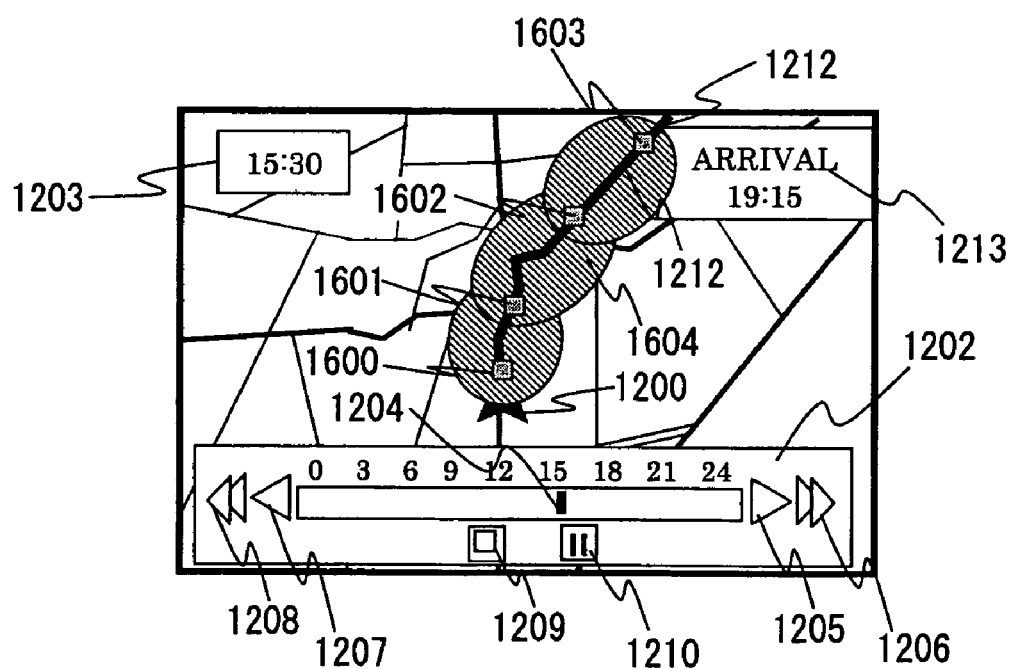
FIG. 16 illustrates the third method of filtering the traffic information.

FIG. 16 illustrates the third method of filtering the traffic information.

The same elements in FIG. 16 as those in FIG. 12 are denoted by the same reference numerals, and the explanation thereof is omitted.

The display processing unit 605 determines that a node of the departure place is the node (0) and a node of the destination is the node (n). The display processing unit 605 obtains all of the nodes (i) included in the recommended route 1212 with reference to the heap table and the link data stored in the data storage device 502. Next, the display processing unit 605 obtains a node pair in the order from the closest node to the node of the departure place, that is, the node (0) and the node (1), the node (1) and the node (2), ..., the node (i) and the node (i+1), ..., the node (n−1) and the node (n). In FIG. 16, the node pair includes the node 1600 and the node 1601, the node 1601 and the node 1602, and the node 1602 and the node 1603. The display processing unit 605 draws an ellipse with the foci at each set of coordinates of the node pair (the major and minor axes are determined from a distance between the foci). In FIG. 16 are shown the ellipses with the foci at the node 1600 and the node 1601, the node 1601 and the node 1602, and the node 1602 and the node 1603, respectively. The inner area 1604 including all the ellipses is a predetermined area to be displayed with the traffic information.

In the fourth method, the links to be displayed in association with the traffic information are further limited than in the third method. The links to be associated with the traffic information are limited to all of the links included in a predetermined area from the predicted arrival location.

Hereinafter, a description will be given on an example of a method of calculating a predetermined area according to the fourth method. The display processing unit 605 obtains a pair of nodes on both ends of the link that includes the predicted arrival location where the vehicle arrives at the specified time, which is calculated in the step S1103 of FIG. 11, from among the node pairs obtained by the third method. The display processing unit 605 draws an ellipse with the foci at the coordinates of the node pair in the same manner as the third method, and determined that the inner area of the ellipse is to be displayed with the traffic information. When the predicted arrival location coincide with one of the node pair or is situated within a predetermined distance from the node pair, the display processing unit 605 may draw the ellipse with the foci at the coordinates of not only the corresponding node pair, but also a plurality of adjacent node pairs so that the inner area of the ellipse is to be displayed with the traffic information.

In the display operation which includes the route search, the filtering of the traffic information as described above makes it possible to exclude the traffic information of the unnecessary roads and display the traffic information of only the necessary roads, and therefore the traffic information can be displayed in a user-friendly and simple manner.

If it is possible to employ the double screen display (display with two windows screens in parallel side-by-side) on the display 501 (see FIG. 5), one screen shows all the links without filtering the roads and another screen shows the links by filtering the roads by means of any one of the first to fourth methods as described above. Therefore, the users can obtain the necessary information as required.

The display processing unit 605 may select or change the type of the road to be displayed according to the map display area, which is specified in the step S1104 of FIGS. 11 and 13. The type of the road includes an inter-urban expressway, an inner-city expressway, a national highway, a principal prefectural road, a general prefectural road, a city road, or the like. The data on the type of the road can be obtained by reference to the link classification of the link data. For example, when the screen displays a street map or the like on the detailed scale (for instance, 25 or 50 meter scale), all of the roads including a non-highway such as the city road is to be displayed. When the screen displays the wide-area map or the like on the broad scale, the roads to be displayed are limited to the higher type of the road (for example, an inter-urban expressway, an inner-city expressway, and a national highway).

(A Method Based on the Traffic Situation)

The above-mentioned methods for filtering the traffic information employ the location data or the attributes data, such as the vehicle location, the link data, and the type of the road. Next, a description will be given on three methods for filtering based on the traffic situation.

Theses methods are employed in the process in the step S1113 in FIGS. 11 and 13.

According to the first method, the link is determined to be in the traffic congestion condition wherein the average speed calculated based on the average speed obtained from the cost (travel time) of the link and the link length is lower than a predetermined speed (traffic speed threshold). Such link is only displayed in association with the traffic information.

The traffic speed threshold may be set separately according to the type of the road. For example, in the VICS that employs the traffic speed threshold according the type of the road, which is determined by the existing traffic information system, the traffic speed threshold is 40 km/H on the inter-city expressways, 20 km/H on the inner-city expressways, and 10 km/H on the other public highways. It is, therefore, possible to extract and display only the necessary traffic information by using the general standards.

The traffic speed threshold may be set according to the scale size of the map. For example, a higher speed (for example, 40 km/H) is set as the traffic speed threshold on the screen showing a street map or the like on the detailed scale (for instance, 25 m or 30 m scale). The lower speed (for example, 10 km/H) may be set on the screen showing the wide-area map on the broad scale. By this method, the adequate amount of the traffic information can be displayed depending on the density of the roads displayed on the map. Furthermore, the traffic information may be filtered by using the data on the traffic congestion degree included in the predicted traffic information. For instance, the traffic congestion degree may be expressed by the three level of the traffic condition, that is, heavy congestion, moderate congestion, and smooth or no congestion. Among the three traffic conditions, the only links showing "heavy congestion", which indicates the most heavy traffic congestion, may be displayed in association with the traffic information.

According to the second method, the links to be displayed in association with the traffic information are limited based on the traffic congestion length. In order to determine the traffic congestion length, for example, the number of the vehicles running at a speed less than or equal to the traffic speed threshold in the link is determined in each type of the road as mentioned above, and the traffic congestion length is determined in the corresponding link based on the above number of the vehicles. When the traveling speed of the link is less than or equal to the traffic speed threshold, the whole link may be determined to be in the heavy traffic congestion, thereby determining that the link length is the traffic congestion length. When the traffic congestion leads to the congestion in the adjacent link, the traffic congestion length may be calculated by adding the lengths of the traffic congestions in the both links. On the screen showing the street map or the like on the detailed scale, the short and long traffic congestions are displayed as the traffic information. On the screen showing the wide-area map or the like on the broad scale, only the longer traffic congestion is displayed as the traffic information.

According to the third method, when the traffic information set in the step S702 of FIG. 7 is the statistical traffic information or the predicted traffic information, the change of the traffic congestion degree is determined and the link to be displayed with the traffic information is limited to the link where the traffic congestion is becoming worse.

Hereinafter, a description will be given on an example of a method for determining the change of the traffic congestion degree.

The display processing unit 605 calculates a travel time T(t) of the corresponding link in the time period including a specified time t and a travel time T(t-Δt) of the corresponding link in the time period including a time (t-Δt), which is a predetermined time before the specified time t. These travel times may be calculated based on the travel time in the predicted traffic information obtained by the display processing unit 605 in the step S1112 of FIGS. 11 and 13, or based on new statistical traffic information obtained from the data storage device 502 by the display processing unit 605. In the present embodiment, the change of the traffic congestion degree is determined by using the travel time data T(t) in the specified time t and the travel time data T(t-Δt) in the time (t-Δt). The display processing unit 605 determines a travel time changing rate R(t) obtained by the equation (2). The travel time changing rate R(t) corresponds to the above-mentioned change of the traffic congestion degree.

[Equation 2]

$$R(t) = \frac{T(t) - T(t - \Delta t)}{T(t)} \quad (2)$$

Table 2 shows a condition determination equation for determining the change of the traffic congestion degree.

TABLE 2

| CONDITION EQUATION | CONGESTION TREND Tr(t) |
|---|---|
| $R(t) < \epsilon_1$ | CONGESTION REDUCING |
| $\epsilon_1 \leq R(t) < \epsilon_2$ | NO CHANGE |
| $\epsilon_2 \leq R(t)$ | CONGESTION WORSENING |

It is possible to determine the increase or decrease of the traffic congestion by the condition determination equation using the changing rate R(t) as shown in Table 2.

[Simple Graphic Display]

Next, a description will be given on the process for displaying the recommended route in a simple graphic according to FIG. 17 with reference to FIGS. 5 and 6.

Figure 17:
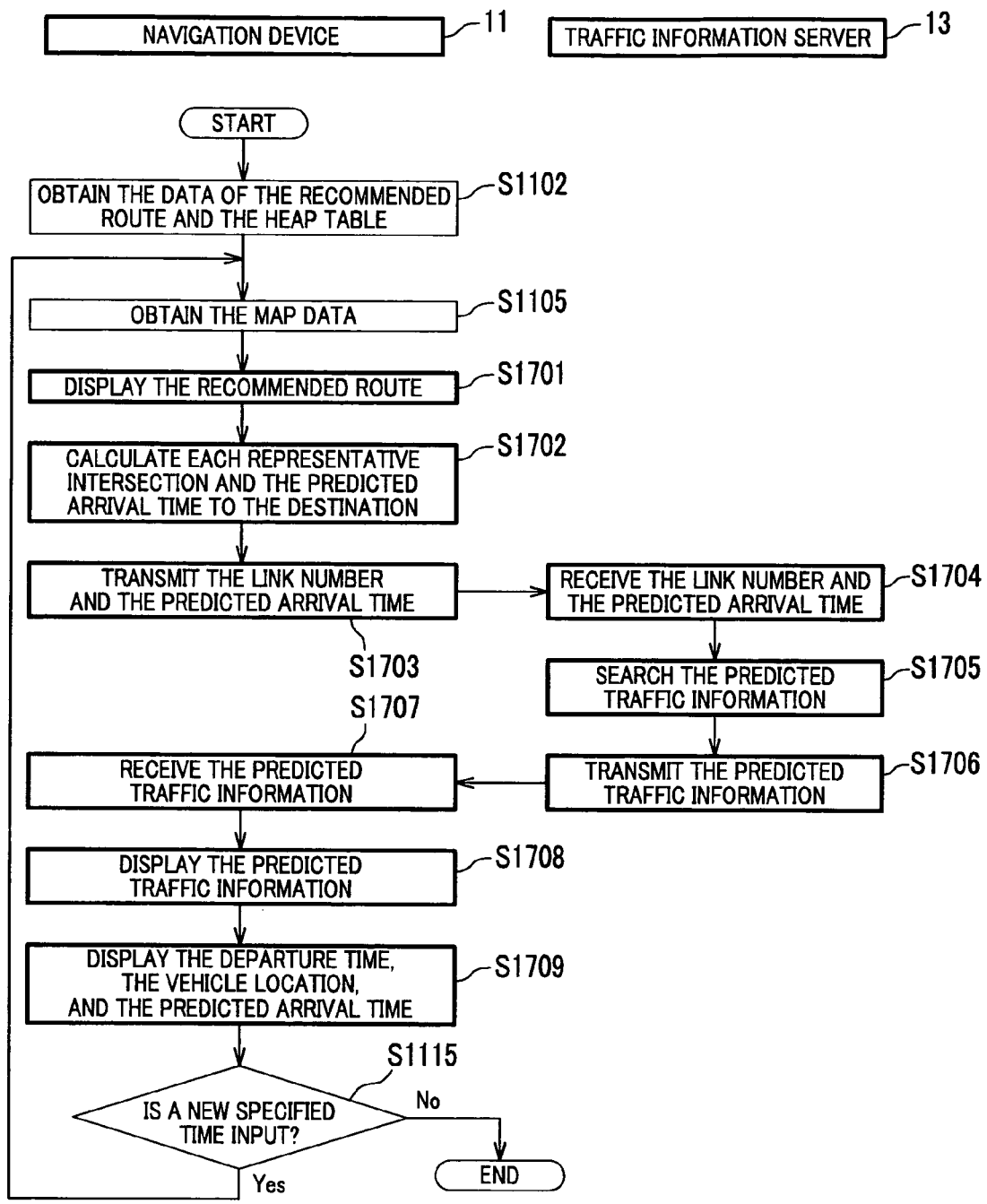
FIG. 17 is a flowchart of the process for displaying the recommended route in a simple graphic.

FIG. 17 is a flowchart of the process of displaying the recommended route in the simple graphic.

In order to show the recommended route in the simple graphic, it is indispensable that the process for the route search (the step S704 of FIG. 7) has been carried out.

In FIG. 17, the process in the steps S1102, S1105 and S1115 are the same as that in FIG. 11.

(Display the Recommended Route in the Simple Graphic)

In the step S1701 for displaying the recommended route, the display processing unit 605 makes the display 501 show the recommended route in each representative intersection, which will be described later, based on the data on the recommended route, which is determined in the step S927 of FIG. 9B, obtained in the step S1102 and the intersection information included in the map data obtained in the step S1105, thereby displaying the recommended route in the simple graphic. An example of the screen for displaying the recommended route in the simple graphic will be described later with reference to FIG. 18.

(Calculate the Representative Intersection and the Predicted Arrival Time to the Destination)

In the step S1702, the display processing unit 605 calculates each representative intersection and the predicted arrival time of the vehicle to the destination. Specifically, the display processing unit 605 obtains the departure time, which is input to the user operation analysis unit 600 in the step S901 of FIG. 9A, and calculates each representative intersection and the predicted arrival time to the destination based on the departure time, the total cost of the decided link in the heap table, and the intersection information included in the map data.

(Search and Obtain the Predicted Traffic Information)

The display processing unit 605 transmits the link number of the link including the representative intersection, the representative intersection and the predicted arrival time to the destination, which are both calculated in the step S1702, to the traffic information server 13 via the communication device 12, the base station 14, and the network 15 (S1703).

The traffic information server 13 then receives the link number of the link on which the representative intersection exists, the representative intersection and the predicted arrival time to the destination, which are both calculated in the step S1702 (S1704), and searches the predicted traffic information based on the link number and the predicted arrival time (S1705). The traffic information server 13 then transmits the corresponding predicted traffic information to the navigation device 11 via the network 15, the base station 14, and the communication device 12.

Next, the navigation device 11 receives the predicted traffic information from the traffic information server 13 (S1707).

(Display the Predicted Traffic Information)

In the step S1708, the predicted traffic information received by the navigation device 11 in the step S1707 is processed by the display processing unit 605, and is then displayed on the display 501 in such a manner as in accordance with the recommended route displayed in the step S1701. Specifically, the display processing unit 605 checks the link number (see FIG. 2) of the received predicted traffic information and the link number of the link making up the recommended route, and based on the result of the check the display processing unit 605 matches the predicted traffic information with the recommended route displayed in the step S1701, thereby making the display 501 show the predicted traffic information.

Furthermore, in the step S1709, the display processing unit 605 makes the display 501 show the departure time set in the step S901, the vehicle location, and the predicted arrival time.

(An Example of the Screen)

Figure 18:
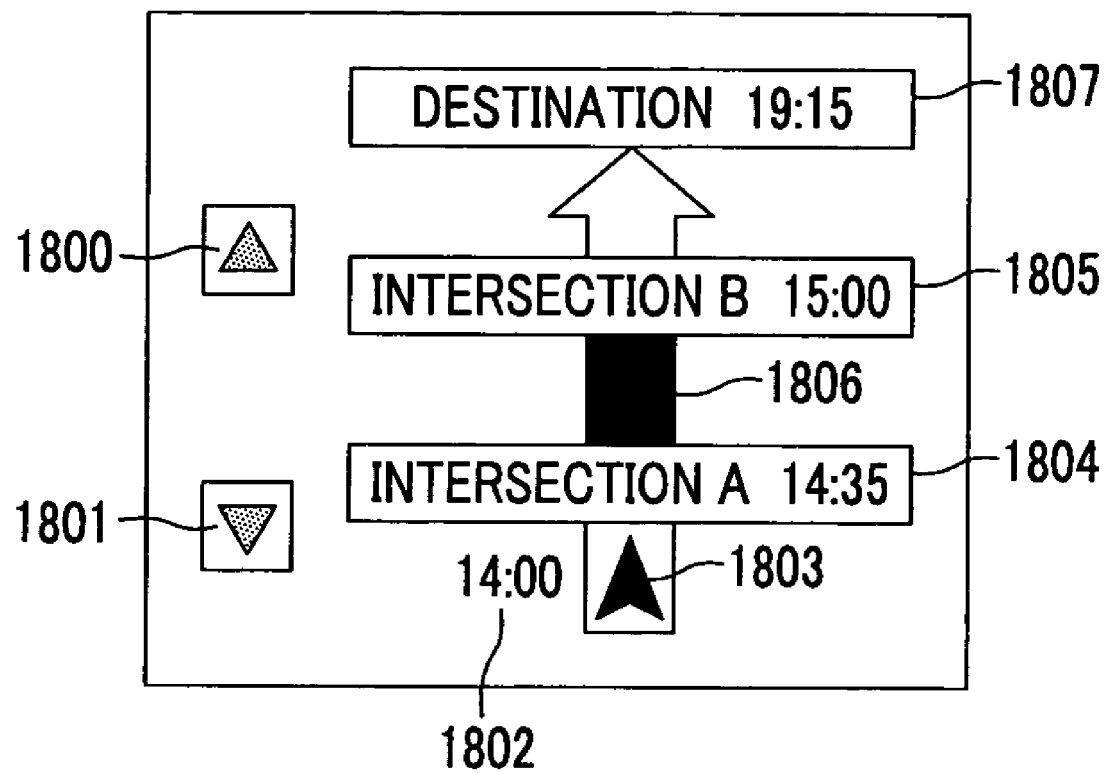
FIG. 18 shows an example of the screen that displays the recommended route in the simple graphic

FIG. 18 shows an example of the screen that displays the recommended route in the simple graphic.

As shown in FIG. 18, the screen that displays the recommended route in the simple graphic includes the departure place set in the step S901 or the current location 1803, the representative intersection (the description will be given later) on the way of the route and the predicted arrival time to the representative intersection 1804, 1805, the destination and the predicted arrival time to the destination 1807, the traffic congestion information (the traffic congestion degree or the traffic congestion length) 1806 on the recommended route, a button 1800 for moving the display location of the vehicle on the recommended route in the traveling direction, a button 1801 for moving the display location of the vehicle on the recommended route in the direction opposite to the traveling direction, and the departure time 1802 set by the user operation analysis unit 600 (see FIG. 6).

The representative intersection may be a specific point, such as a large-scale intersection included in the above-mentioned map data, or a guidance intersection (a point to turn right or left) included in guidance data. As shown in FIG. 18, the representative intersection may be a starting or ending point of the traffic congestion, which is determined dynamically depending on the traffic information. In that case, a name of the representative intersection is searched from name data of the neighboring intersections, and is indicated with the addition of the word "near" to show that the representative intersection is located near the neighboring intersection.

The traffic congestion information is displayed with different colors according to the traffic congestion degree, or with different proportion of areas to be painted according to the traffic congestion length.

When the buttons 1800, 1801 are selected through the input device 504 (see FIG. 5) to change the specified time, the representative intersection is designated according to the specified time and the predicted arrival times 1804, 1805 to the representative intersection are accordingly changed. However, the screen may always display the departure place or the current location 1803, the departure time 1802, and the destination, irrespective of the selection of the buttons 1800, 1801. It is, therefore, possible for a user to easily see a temporal and positional relation of the representative intersection and the departure place (current location) or the destination, for example, to see whether the displayed representative intersection is situated ahead of or behind the intermediate location of the route.

[Display the Weather Information]

Although the description has been provided with regard to the display of the traffic information, the traffic information may be displayed together with other information on the space and the time. For example, if the predicted weather information can be obtained, the traffic information can be displayed with the predicted weather information on the predicted arrival location of the predicted arrival time.

(Display the Weather Information on the Normal Display)

Figure 19:
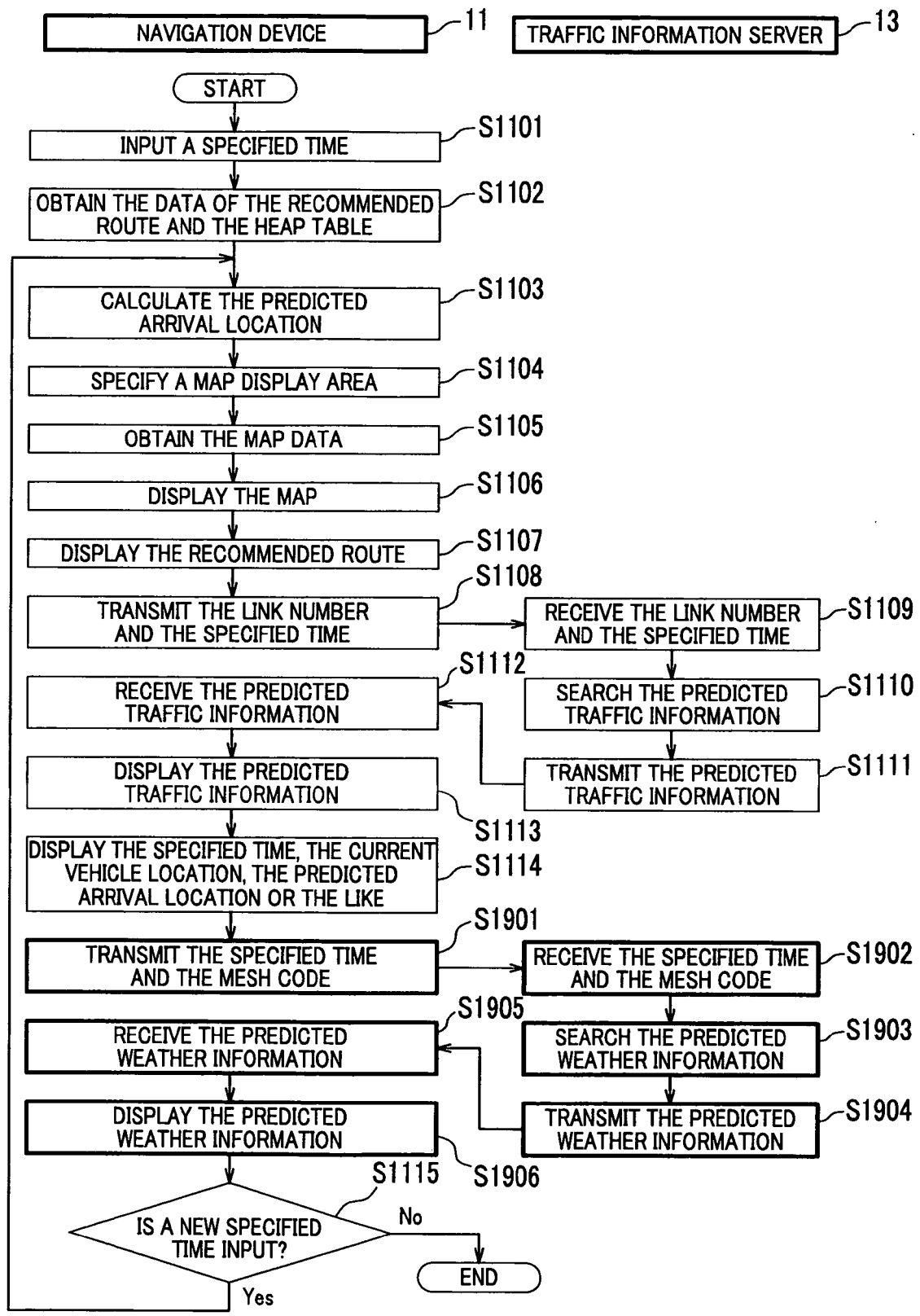
FIG. 19 is a flowchart of the process for displaying the predicted weather information on the display where the traffic information is normally displayed without using the simple graphic.

FIG. 19 is a flowchart of the process for displaying the predicted weather information on the display where the traffic information is normally displayed without using the simple graphic.

A description will be given on the process for displaying the predicted weather information on the normal display of the traffic information according to FIG. 19 with reference to FIGS. 1, 5, and 6.

In FIG. 19, the process in the steps S1101 to S1115 is the same as those in FIG. 11.

After the step S1114, the display processing unit 605 transmits the specified time and the mesh code including the link, in which the predicted arrival location of the specified time exits, to the traffic information server 13 via the communication device 12, the base station 14, and the network 15 (S1901). The display processing unit 605 searches the map data to obtain the mesh code based on the link number of the link, in which the predicted arrival location of the specified time exists, or the like.

Next, the traffic information server 13 receives the specified time and the mesh code (S1902), based on which the traffic information server 13 searches the predicted weather information (S1903). It should be noted that the predicted weather information is transmitted to the traffic information server 13 from the weather information center 17 in advance.

The traffic information server 13 transmits the predicted weather information obtained in the step S1903 to the navigation device 11 via the network 15, the base station 14, and the communication device 12 (S1904).

The navigation device 11 then receives the predicted weather information, i.e. the predicted weather information on the predicted arrival location on the recommended route at the specified time (S1905). The predicted weather information is processed in the display processing unit 605, and is then displayed on the display 501 (S1906).

The weather information is weather forecast information indicating whether it is sunny, cloudy, rainy, snowy or the like, and the weather is forecasted in each mesh, which is defined by dividing areas on the earth into a predetermined section, or at each future time. The predicted weather information may be a predicted rainfall probability instead of the above-mentioned weather forecast information.

(An Example of the Screen for Displaying the Predicted Weather Information on the Normal Display)

Figure 20:
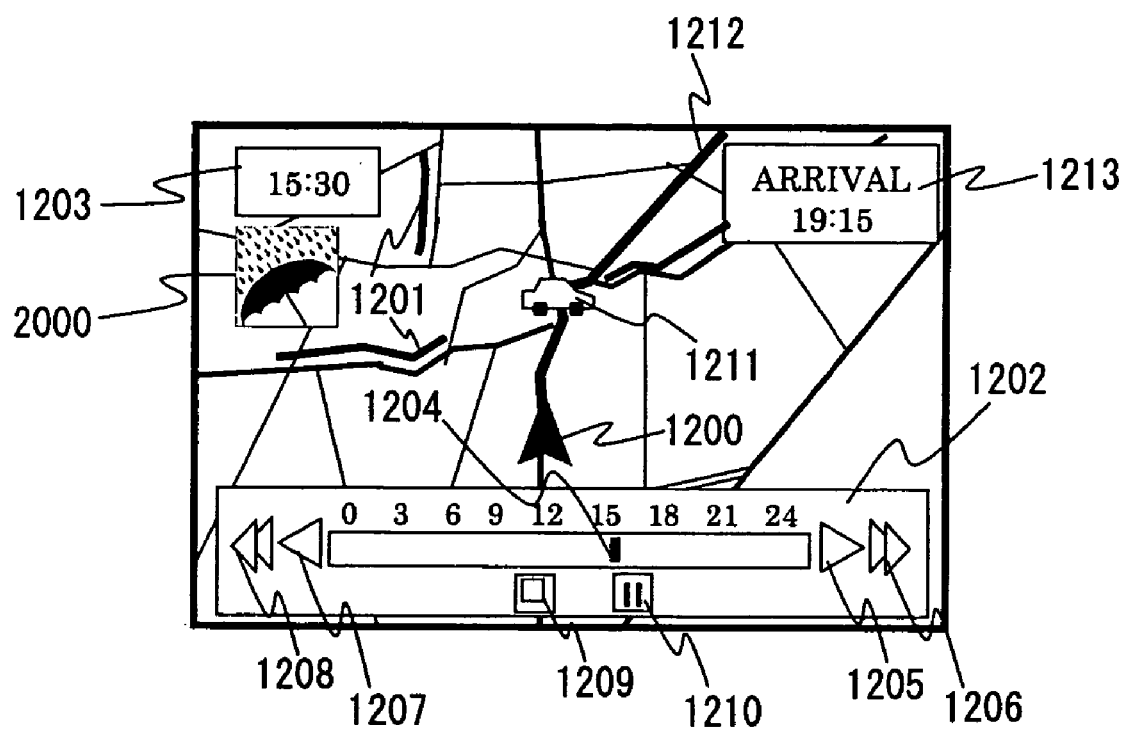
FIG. 20 shows an example of the screen for displaying the predicted weather information on the display where the traffic information is normally displayed.

FIG. 20 shows an example of the screen for displaying the predicted weather information on the display where the traffic information is normally displayed.

The same elements in FIG. 20 as those in FIG. 12 are denoted by the same reference numerals, and the explanation thereof is omitted.

In FIG. 20, the predicted weather information on the mesh including the predicted arrival location 1211 is indicated by an icon 2000.

It is, therefore, possible to display the weather information in the vicinity of the predicted arrival location in a user-friendly manner.

The example of the screen shown in FIG. 20 shows the screen where the traffic information is not filtered. However, the predicted weather information may be displayed on the screen where the traffic information has been filtered.

(Display in the Simple Graphic)

Figure 21:
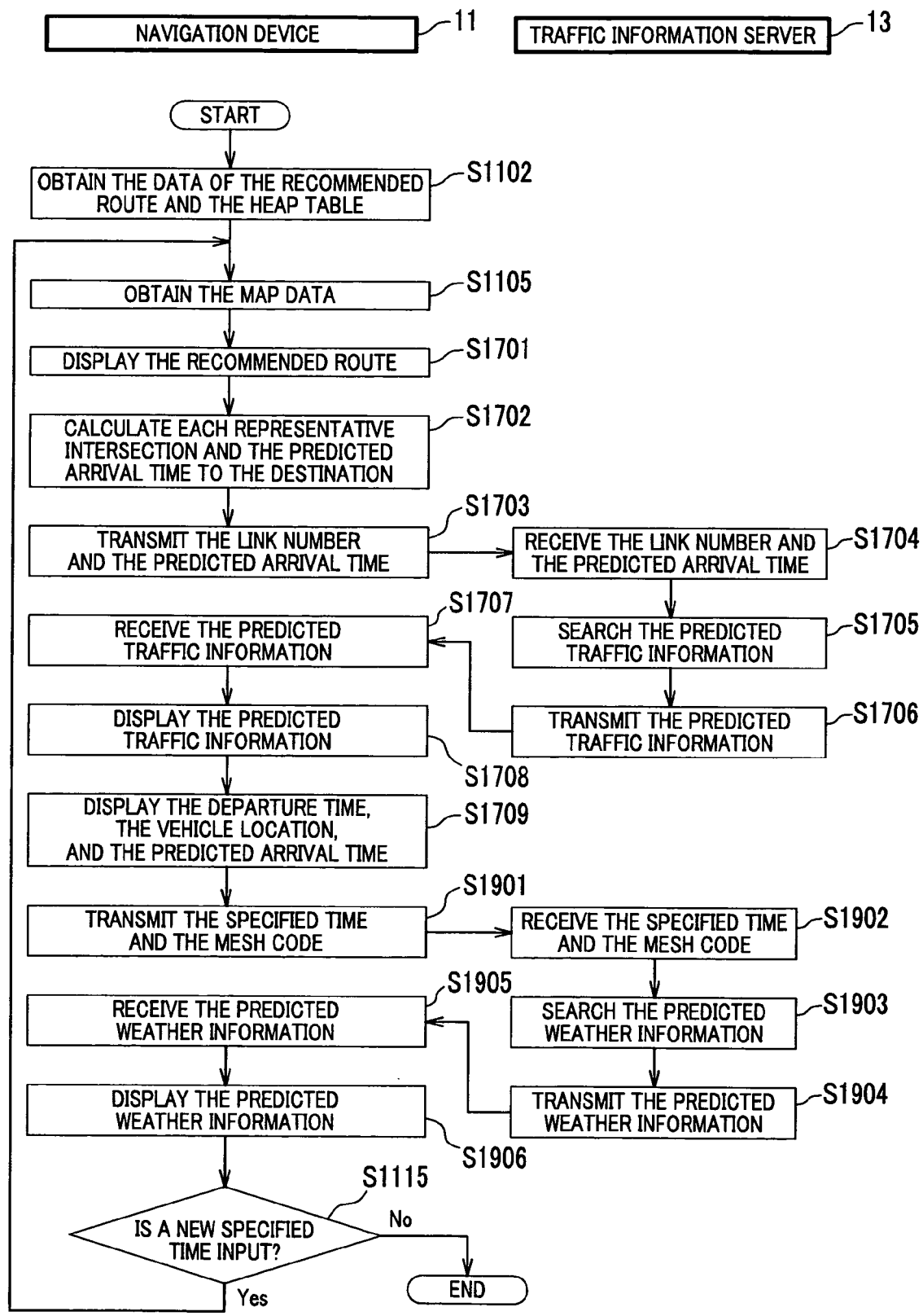
FIG. 21 is a flowchart of the process for displaying the predicted weather information on the display where the traffic information is displayed in the simple graphic.

FIG. 21 is a flowchart of the process for displaying the predicted weather information on the display where the traffic information is displayed in the simple graphic.

In FIG. 21, the process in the steps S1102 to S1709, and S1115 are the same as that in FIG. 17. The process in the steps S1901 to S1906 is the same as that in FIG. 19.

Figure 22:
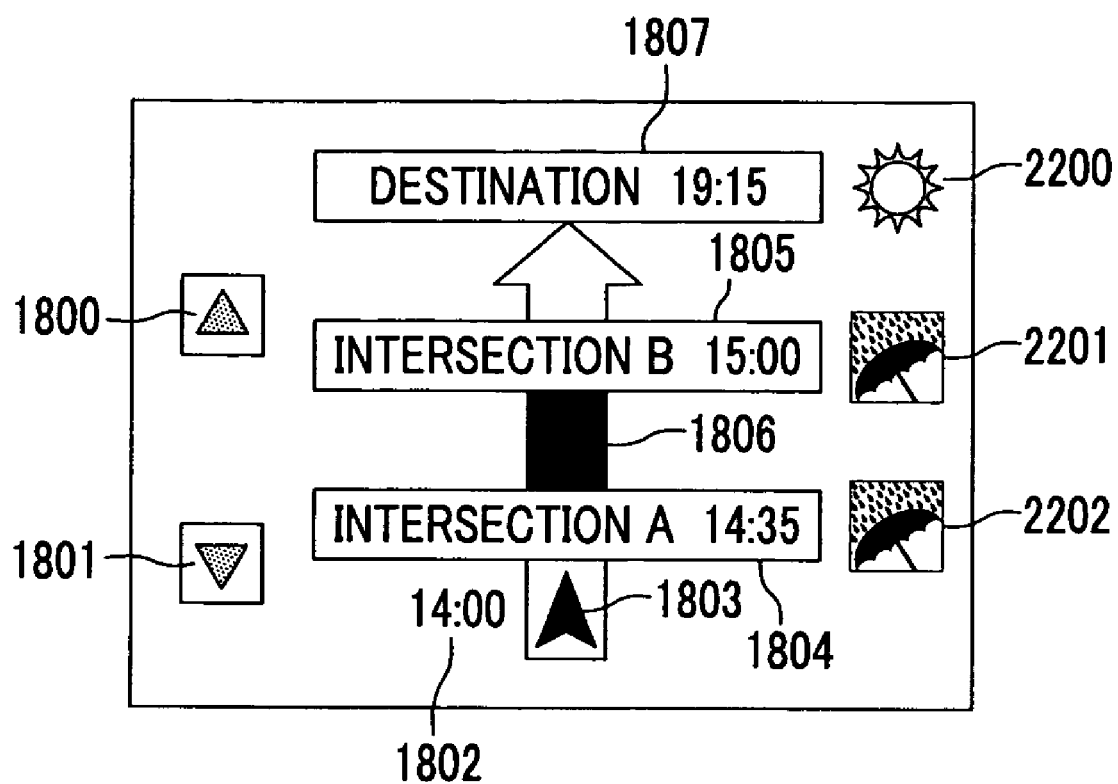
FIG. 22 shows an example of the screen for displaying the predicted weather information on the display where the traffic information is displayed in the simple graphic.

FIG. 22 shows an example of the screen for displaying the predicted weather information on the display where the traffic information is displayed in the simple graphic.

The same elements in FIG. 22 as those in FIG. 18 are denoted by the same reference numerals, and the explanation thereof is omitted.

As shown in FIG. 22, the predicted weather information is indicated by icons 2200 to 2202 at each point (mesh) of an intersection A and an intersection B, which are the representative intersections, and the destination.

It is, therefore, possible for a user to know the weather information on not only the predicted arrival location but also each point on the way of the route.

What is claimed is:

1. A method for displaying traffic information making use of:
   a traffic information storage unit that stores traffic information on a future traffic situation of a link;
   a map data storage unit that stores map data;
   an operation input unit that inputs operations of a user;
   a positioning data acquisition unit that acquires data necessary to measure a location of a vehicle;
   a data processing unit that is coupled to said traffic information storage unit, said map data storage unit, said operation input unit, and said positioning data acquisition unit, and that performs data processing; and
   a display unit that displays processing results of said data processing unit,
   the method comprising the steps, carried out by said data processing unit, of:
   measuring a location of the vehicle based on data obtained from said positioning data acquisition unit;
   calculating a recommended route to be traveled by the vehicle;
   receiving a specified future time, which is later than a departure time designated by the user, through said operation input unit;
   calculating a predicted arrival location on said recommended route where the vehicle arrives at the specified future time, based on data of the links making up said recommended route and said specified future time, the calculation of the predicted arrival location including calculating a predicted arrival time to each link;
   specifying an area of a map to be displayed based on said predicted arrival location and the predicted arrival time to each link, and then obtaining map data of the specified area from said map data storage unit;
   obtaining traffic information of the specified future time from said traffic information storage unit; and
   making said display unit show the links in said map data with said traffic information within an area of ellipses that are superimposed on said display unit, each of the ellipses has foci of start and end nodes of one of the links, including a first link on which said predicted arrival location lies, and the others located ahead of the first link on the recommended route;
   the method further comprising the steps, carried out by said data processing unit, of:
   calculating a time change in said traffic information indicating a degree of change in traffic congestion;
   selecting said links based on said time change; and
   making said display unit show said selected links in association with said traffic information corresponding to said links;
   wherein said change of traffic congestion degree is determined, and said links to be displayed with said traffic information is limited to the links where said traffic congestion is becoming worse.

2. The method for displaying the traffic information according to claim 1,
   the method comprising the steps by said data processing unit of:
   obtaining predicted weather information on the recommended route including said predicted arrival location of said specified time from said traffic information storage unit, and
   making said display unit show said predicted weather information.

3. A navigation system comprising:
   a traffic information storage unit that stores traffic information on a future traffic situation of a link;
   a map data storage unit that stores map data;
   an operation input unit that inputs operations of a user;
   a positioning data acquisition unit that acquires data necessary to measure a location of a vehicle;
   a data processing unit that is coupled to said traffic information storage unit, said map data storage unit, said operation input unit, and said positioning data acquisition unit, and that performs data processing; and
   a display unit that displays processing results of said data processing unit,
   wherein said data processing unit:
   measures a location of the vehicle based on data obtained from said positioning data acquisition unit;
   calculates a recommended route to be traveled by the vehicle;
   receives a specified future time, which is later than a departure time designated by the user, through said operation input unit;
   calculates a predicted arrival location on said recommended route where the vehicle arrives at the specified future time, based on data of the links making up said recommended route and said specified future time, the calculation of the predicted arrival location including calculating a predicted arrival time to each link;
   specifies an area of a map to be displayed based on said predicted arrival location and the predicted arrival time to each link, and then obtaining map data of the specified area from said map data storage unit;
   obtains traffic information of the specified future time from said traffic information storage unit; and
   makes said display unit show the links in said map data with said traffic information within an area of ellipses that are superimposed on said display unit, each of the ellipses has foci of start and end nodes of one of the links, including a first link on which said predicted arrival location lies, and the others located ahead of the first link on the recommended route;
   wherein said data processing unit further:
   calculates a time change in said traffic information indicating a degree of change in traffic congestion;
   selects said links based on said time change; and
   makes said display unit show said selected links in association with said traffic information corresponding to said links, and
   wherein said change of traffic congestion degree is determined, and said links to be displayed are limited to the links where said traffic congestion is becoming worse.

4. The navigation system according to claim 3,
   wherein said data processing unit:
   obtains predicted weather information on the recommended route including said predicted arrival location of said specified time from said traffic information storage unit, and
   makes said display unit show said predicted weather information.

* * * * *